(12) United States Patent
Clydesdale

(10) Patent No.: US 11,972,495 B2
(45) Date of Patent: Apr. 30, 2024

(54) SYSTEMS, METHODS, AND COMPUTER SYSTEMS FOR ENABLING A PRIVATE UTILITY

(71) Applicant: Paficic Inc., Orillia (CA)

(72) Inventor: Craig Clydesdale, Oakville (CA)

(*) Notice: Subject to any disclaimer, the term of this patent is extended or adjusted under 35 U.S.C. 154(b) by 105 days.

(21) Appl. No.: 17/439,037

(22) PCT Filed: Mar. 11, 2020

(86) PCT No.: PCT/CA2020/050322
§ 371 (c)(1),
(2) Date: Sep. 14, 2021

(87) PCT Pub. No.: WO2020/181377
PCT Pub. Date: Sep. 17, 2020

(65) Prior Publication Data
US 2022/0156855 A1 May 19, 2022

Related U.S. Application Data

(60) Provisional application No. 62/818,468, filed on Mar. 14, 2019.

(51) Int. Cl.
*G06Q 50/06* (2012.01)
*G05B 15/02* (2006.01)
(Continued)

(52) U.S. Cl.
CPC ............ *G06Q 50/06* (2013.01); *G05B 15/02* (2013.01); *H02J 3/381* (2013.01);
(Continued)

(58) Field of Classification Search
CPC .... G06Q 50/06; G06Q 30/0206; G06Q 30/04; G05B 15/02; H02J 3/381;
(Continued)

(56) References Cited

U.S. PATENT DOCUMENTS

2006/0276938 A1 12/2006 Miller
2011/0204720 A1 8/2011 Ruiz et al.
(Continued)

OTHER PUBLICATIONS

Canadian Intellectual Property Office as ISA, International Search Report and Written Opinion for PCT/CA2020/050322, dated Jun. 22, 2021.

*Primary Examiner* — Mohammad Ali
*Assistant Examiner* — Saad M Kabir
(74) *Attorney, Agent, or Firm* — Own Innovation; James W. Hinton; Kent C. Howe

(57) ABSTRACT

Systems, methods, and computer systems for intelligent power supply are provided herein. The system enables a private utility at a building. The system includes a plurality of power sources. Each of the power sources is configured to provide power to the building when enabled. The system also includes at least one external data source, at least one onsite data source, and a computer system. The computer system is communicatively connected to the power sources, the external data source, and the onsite data source. The computer system receives external data from the external data source and building data from the onsite data source. The computer system determines a preferred power source based on the external data and the building data.

20 Claims, 9 Drawing Sheets

(51) Int. Cl.
*H02J 3/38* (2006.01)
*H02J 13/00* (2006.01)

(52) U.S. Cl.
CPC .. *H02J 13/00004* (2020.01); *H02J 13/00022* (2020.01); *H02J 2310/12* (2020.01)

(58) Field of Classification Search
CPC ........... H02J 13/00004; H02J 13/00022; H02J 2310/12; Y02B 90/20; Y04S 40/126; Y04S 50/12; Y04S 50/14
USPC ....................................................... 700/287
See application file for complete search history.

(56) References Cited

U.S. PATENT DOCUMENTS

| | | |
|---|---|---|
| 2012/0193987 A1 | 8/2012 | Siglock |
| 2014/0309800 A1 | 10/2014 | Morin et al. |
| 2017/0005515 A1 | 1/2017 | Sanders et al. |

SYSTEMS, METHODS, AND COMPUTER SYSTEMS FOR ENABLING A PRIVATE UTILITY

TECHNICAL FIELD

The following relates generally to power generation and supply, and more particularly to a system and method for enabling a private utility using an intelligent power supply.

INTRODUCTION

Energy requirements across the world are evolving. Electricity generated by the public electrical grid may rely on centralized, inefficient, and unreliable power sources.

The public electrical grid may have difficulties in meeting increasing energy demands. The public electrical grid may be susceptible to power outages (e.g. severe weather events, physical and cyber threats, operations error, etc.). Antiquated infrastructure may need constant capital investment to maintain, increasing costs for businesses. Current methods of electricity production and generation may not be environmentally friendly.

Fluctuations in the cost of publicly supplied energy can lead to unpredictable and expensive bills for customers. Fluctuations in the reliability of publicly supplied energy may also be inconvenient. Reliability of public utility may be affected by weather, cyber and physical attacks, and other factors. For example, power grids may be struck by a cyber or physical attack approximately once every four days. Consequences of the public grid going down may include discontinuity of daily activities or disruption of business operations.

Approaches to dealing with fluctuations in cost, reliability, and other problems associated with publicly supplied power are typically rudimentary and unsophisticated. One such approach includes having a secondary power source, such as a generator, on-site. The secondary power source may be turned on under certain conditions, such as when the primary power source (e.g. the public utility) goes down, or during a time when the price of the primary power source is known to be higher. This typically involves limited monitoring and managing on the part of the customer and decision-making regarding when to turn on the secondary power source and power source purchase decisions. In an example, this may include the customer manually switching to the secondary power source and possibly leaving the secondary power source on.

Accordingly, there is a need for systems and methods for power generation and supply that overcome at least some of the disadvantages of current systems and methods, including those relying heavily on the public grid.

SUMMARY

Provided is a system for enabling a private utility at a building. The system includes a plurality of power sources, each of the power sources configured to provide power to the building when enabled, at least one external data source, at least one onsite data source, and a computer system communicatively connected to the plurality of power sources, the at least one external data source, and the at least one onsite data source. The computer system is configured to receive external data about the plurality of power sources from the at least one external data source, receive building data about the plurality of power sources from the at least one onsite data source, and determine a preferred power source for the building based on the external data and the building data.

The plurality of power sources may include an offsite power source and at least one onsite power source.

The least one onsite power source may include a diesel generator and a natural gas generator.

The at least one onsite data source may include a subsystem and an intelligent end device, the subsystem and the intelligent end device each configured to transmit building data to the computer system.

The system may further include a control subsystem communicatively connected to the computer system and the plurality of power sources. The control subsystem is configured to receive a control instruction from the computer system, the control instruction generated by the computer system based on the preferred power source determination, and adjust an operating parameter of at least one of the power sources according to the control instruction.

The computer system may include an offsite computing device and an onsite computing device, the offsite and onsite computing devices communicatively connected to each other via a secure network, wherein the offsite computing device is communicatively connected to the at least one external data source via a first network, and wherein the onsite computing device is communicatively connected to the at least one onsite data source via a second network.

Provided is a computer system for intelligently determining a preferred power source for providing power to a building, the power source determined from a plurality of power sources. The computer system includes a memory in communication with a processor, the memory comprising power source data, wherein the power source data includes external data and building data. The processor includes a source determinator configured to analyze the power source data to determine the preferred power source from the plurality of power sources.

The memory may include at least one comparator, and wherein the source determinator determines the preferred power source by comparing the power source data to the comparator.

The comparator may be a threshold or a performance band.

The processor may include a source controller module. The source controller module is configured to receive the preferred power source determination from the source determinator, compare the preferred power source determination with active power source data, the active power source data stored in the memory, and generate a control instruction based on the comparison of the preferred power source determination with the active power source data.

The memory may include power source hierarchy data, the power source hierarchy data including a primary power source and a secondary power source.

The processor may include an external data collector module for collecting at least a portion of the external data from the at least one external data source.

The external data may include at least one of weather data, price data, demand data, temperature data, conversion cost data, stakeholder data, and measurement and verification data.

The building data may include at least one of subsystem data, intelligent end device data, meter data, source activation data, byproduct data, and environmental impact data.

The source determinator may be configured to analyze cost data for the power sources and determine a preferred power source based on the cost data.

The source determinator may be configured to analyze reliability data for the power sources and determine a preferred power source based on the reliability data.

The source determinator is may be configured to analyze safety data for the power sources and determine a preferred power source based on the safety data.

Provided is a method of enabling a private utility at a building, The method includes providing a plurality of onsite power sources, wherein one of the plurality of power sources is enabled such that the enabled power source provides power to the building, determining a preferred power source for the building based on power source data, the power source data including building data and external data for the plurality of power sources, and if the preferred power source is different from the enabled power source, changing the enabled power source such that the building receives power from the preferred power source.

The method may further include receiving, at an offsite computing device, the external data from at least one external data source, and receiving, at an onsite computing device, the building data from at least one onsite data source.

Determining the preferred power source may include comparing at least a subset of the power source data to a comparator.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings.

DETAILED DESCRIPTION

Figure 1:
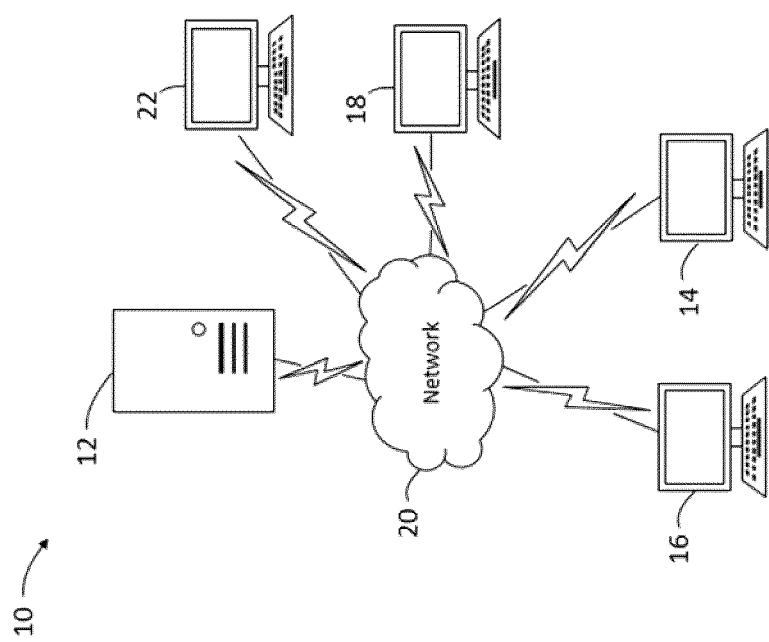
FIG. 1 is a schematic diagram of a system for enabling a private utility, according to an embodiment.

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

One or more systems described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a mainframe computer, server, and personal computer, cloud based program or system, laptop, personal data assistance, cellular telephone, smartphone, or tablet device.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein.

A description of an embodiment with several components in communication with each other does not imply that all such components are required. On the contrary, a variety of optional components are described to illustrate the wide variety of possible embodiments of the present invention.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The present disclosure provides a dedicated energy system for a building. The dedicated energy system provides a viable energy alternative to the public grid. The dedicated energy system provides power to the building. The building may be an industrial facility such as a manufacturing plant. The dedicated energy system may be considered a "private utility" for the building.

Referring now to FIG. 1, shown therein is a block diagram illustrating a system 10, in accordance with an embodiment. The system 10 includes an application integration server platform 12, which communicates with a plurality of offsite devices 16, 18 and 22 via a network 20. The system 10 also includes a digital control system server platform 14, which can communicate with a plurality of onsite devices 24, 26 via the network 20. The onsite devices 24, 26 may include one or more intelligent end devices 24 and one or more subsystem devices 26. The application integration server platform 12 can communicate with the digital control server platform 14 via the network 20.

The application integration server platform 12 may be a purpose-built machine designed specifically for analyzing offsite (e.g. supply) and onsite (e.g. use) power source data and determining a preferred power source suggestion for the building.

The digital control system server platform 14 may be a purpose-built machine designed specifically for analyzing offsite (e.g. supply) and onsite (e.g. use) power source data and determining a preferred power source suggestion for the building, and for controlling the supply of power to the building according to results of the analysis.

The server platforms 12 and 14, and devices 16, 18 and 22 may be a server computer, desktop computer, notebook computer, tablet, PDA, smartphone, or another computing device. In an embodiment, the server platform 14 may include an embedded computer and an industrial programmable logic controller (PLC) or similar device, in communication with one another. The devices 12, 14, 16, 18, 22 may include a connection with the network 20 such as a wired or wireless connection to the Internet. In some cases, the network 20 may include other types of computer or telecommunication networks. In particular, the network 20 may include a plurality of networks, some of which may be private and/or secure. For example, the digital control server platform 14, the application integration server platform 12, and the onsite devices (or any combination thereof) may communicate with one another one or more private and/or secure networks.

The devices 12, 14, 16, 18, 22 may include one or more of a memory, a secondary storage device, a processor, an input device, a display device, and an output device. Memory may include random access memory (RAM) or similar types of memory. Also, memory may store one or more applications for execution by processor. Applications may correspond with software modules comprising computer executable instructions to perform processing for the functions described below. Secondary storage device may include a hard disk drive, floppy disk drive, CD drive, DVD drive, Blu-ray drive, or other types of non-volatile data storage. Processor may execute applications, computer readable instructions or programs. The applications, computer readable instructions or programs may be stored in memory or in secondary storage, or may be received from the Internet or other network 20.

Input device may include any device for entering information into device 12, 14, 16, 18, 22. For example, input device may be a keyboard, key pad, cursor-control device, touch-screen, camera, or microphone. Display device may include any type of device for presenting visual information. For example, display device may be a computer monitor, a flat-screen display, a projector or a display panel. Output device may include any type of device for presenting a hard copy of information, such as a printer for example. Output device may also include other types of output devices such as speakers, for example. In some cases, device 12, 14, 16, 18, 22 may include multiple of any one or more of processors, applications, software modules, second storage devices, network connections, input devices, output devices, and display devices.

Although devices 12, 14, 16, 18, 22 are described with various components, one skilled in the art will appreciate that the devices 12, 14, 16, 18, 22 may in some cases contain fewer, additional or different components. In addition, although aspects of an implementation of the devices 12, 14, 16, 18, 22 may be described as being stored in memory, one skilled in the art will appreciate that these aspects can also be stored on or read from other types of computer program products or computer-readable media, such as secondary storage devices, including hard disks, floppy disks, CDs, or DVDs; a carrier wave from the Internet or other network; or other forms of RAM or ROM. The computer-readable media may include instructions for controlling the devices 12, 14, 16, 18, 22 and/or processor to perform a particular method.

Devices such as server platforms 12 and 14 and devices 16, 18 and 22 can be described performing certain acts. It will be appreciated that any one or more of these devices may perform an act automatically or in response to an interaction by a user of that device. That is, the user of the device may manipulate one or more input devices (e.g. a touchscreen, a mouse, or a button) causing the device to perform the described act. In many cases, this aspect may not be described below, but it will be understood.

As an example, it is described below that the devices 12, 14, 16, 18, 22 may send information to the server platforms 12 and 14. For example, a user using the device 18 may manipulate one or more inputs (e.g. a mouse and a keyboard) to interact with a user interface displayed on a display of the device 18. Generally, the device may receive a user interface from the network 20 (e.g. in the form of a webpage). Alternatively, or in addition, a user interface may be stored locally at a device (e.g. a cache of a webpage or a mobile application).

Server platform 12 may be configured to receive and send a plurality of information, to and from each of the plurality of offsite devices 16, 18, 22 and the server 14. Server platform 14 may be configured to receive and send a plurality of information to and from each of the plurality of onsite devices and the server 12. Generally, the information may comprise at least an identifier identifying the system provider, service provider, cold storage, or blockchain infrastructure computer. For example, the information may comprise one or more of a username, e-mail address, password, social media handle.

In response to receiving information, the server platform 12 may store the information in storage database. The storage may correspond with secondary storage of the devices 16, 18 and 22 and the server 14. Generally, the storage database may be any suitable storage device such as a hard disk drive, a solid state drive, a memory card, or a disk (e.g. CD, DVD, or Blu-ray etc.). Also, the storage database may be locally connected with server platform 12. In some cases, storage database may be located remotely from server platform 12 and accessible to server platform 12 across a network for example. In some cases, storage database may comprise one or more storage devices located at a networked cloud storage provider.

Figure 2:
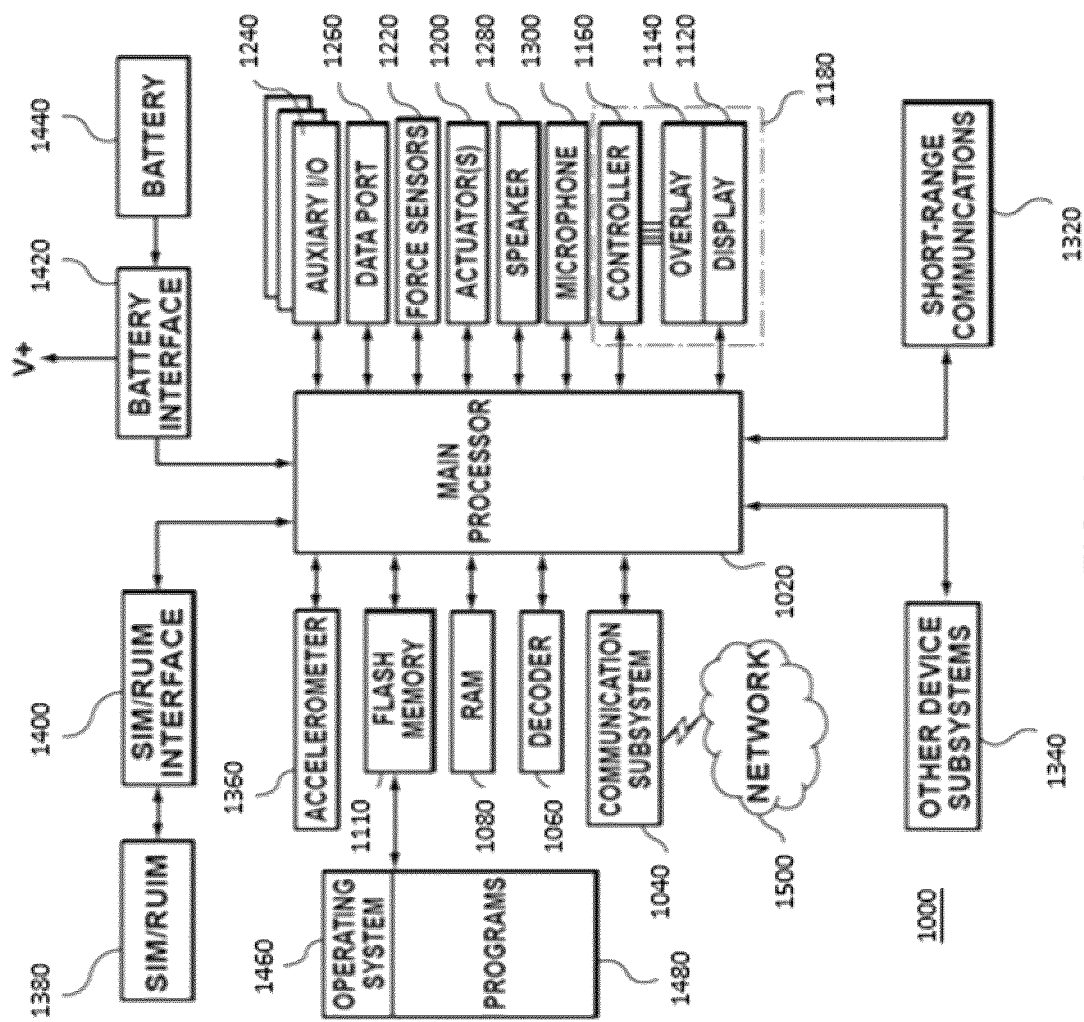
FIG. 2 is a block diagram of a computing device of the system of FIG. 1.

FIG. 2 shows a simplified block diagram of components of a device 1000, such as a mobile device or portable electronic device. The device 1000 includes multiple components such as a processor 1020 that controls the operations of the device 1000. Communication functions, including data communications, voice communications, or both may be performed through a communication subsystem 1040. Data received by the device 1000 may be decompressed and decrypted by a decoder 1060. The communication subsystem 1040 may receive messages from and send messages to a wireless network 1500.

The wireless network 1500 may be any type of wireless network, including, but not limited to, data-centric wireless networks, voice-centric wireless networks, and dual-mode networks that support both voice and data communications.

The device 1000 may be a battery-powered device and as shown includes a battery interface 1420 for receiving one or more rechargeable batteries 1440.

The processor 1020 also interacts with additional subsystems such as a Random Access Memory (RAM) 1080, a flash memory 1100, a display 1120 (e.g. with a touch-sensitive overlay 1140 connected to an electronic controller 1160 that together comprise a touch-sensitive display 1180), an actuator assembly 1200, one or more optional force sensors 1220, an auxiliary input/output (I/O) subsystem 1240, a data port 1260, a speaker 1280, a microphone 1300, short-range communications systems 1320 and other device subsystems 1340.

In some embodiments, user-interaction with the graphical user interface may be performed through the touch-sensitive overlay 1140. The processor 1020 may interact with the touch-sensitive overlay 1140 via the electronic controller 1160. Information, such as text, characters, symbols, images, icons, and other items that may be displayed or rendered on a portable electronic device generated by the processor 102 may be displayed on the touch-sensitive display 118.

The processor 1020 may also interact with an accelerometer 1360 as shown in FIG. 1. The accelerometer 1360 may be utilized for detecting direction of gravitational forces or gravity-induced reaction forces.

To identify a subscriber for network access according to the present embodiment, the device 1000 may use a Subscriber Identity Module or a Removable User Identity Module (SIM/RUIM) card 1380 inserted into a SIM/RUIM interface 1400 for communication with a network (such as the wireless network 1500). Alternatively, user identification information may be programmed into the flash memory 1100 or performed using other techniques.

The device 1000 also includes an operating system 1460 and software components 1480 that are executed by the processor 1020 and which may be stored in a persistent data storage device such as the flash memory 1100. Additional applications may be loaded onto the device 1000 through the wireless network 1500, the auxiliary I/O subsystem 1240, the data port 1260, the short-range communications subsystem 1320, or any other suitable device subsystem 1340.

For example, in use, a received signal such as a text message, an e-mail message, web page download, or other data may be processed by the communication subsystem 1040 and input to the processor 1020. The processor 1020 then processes the received signal for output to the display 1120 or alternatively to the auxiliary I/O subsystem 1240. A subscriber may also compose data items, such as e-mail messages, for example, which may be transmitted over the wireless network 1500 through the communication subsystem 1040.

For voice communications, the overall operation of the portable electronic device 1000 may be similar. The speaker 1280 may output audible information converted from electrical signals, and the microphone 1300 may convert audible information into electrical signals for processing.

The present disclosure provides an intelligent power system and method. The system includes a plurality of power sources for delivering power to a building. The power sources include one or more onsite power sources. The power sources may include an offsite power source (e.g. utility). A computer system including an onsite computing device and an offsite computing device analyzes various power source data including external data and building data and determines a preferred power source for the building from the available power sources. The offsite computing device may perform similar analyses for other buildings. The onsite computing device controls the power sources such that the preferred power source delivers power to the building. Control operations may include activating an inactive power source or altering the output of an active power source.

Figure 3:
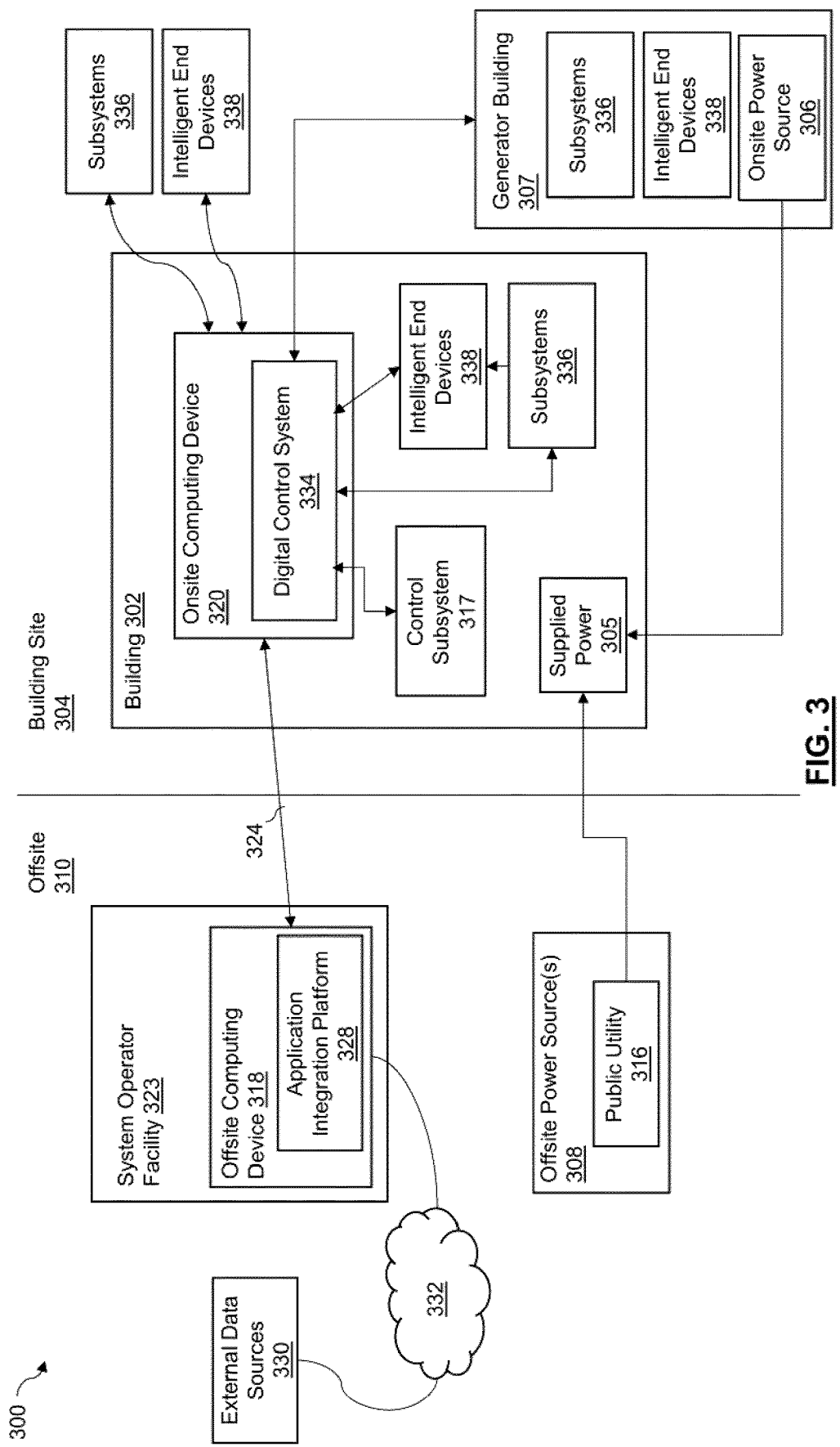
FIG. 3 is a block diagram of a system for enabling a private utility, according to an embodiment.

Referring now to FIG. 3, shown therein is a system 300 for intelligently providing power to a building 302, according to an embodiment. The building 302 is located at a building site 304. The building 302 may be a commercial or industrial building. The building 302 may be a manufacturing facility. The building 302 may be a high-rise apartment building or a multi-residential unit. The system 300 may be particularly advantageous for organizations and businesses with high demand, such as in agriculture and industrial manufacturing.

The building site 304 includes a generator building. The generator building may be located in close proximity to the building 302. The generator building may be portable. By being portable, the generator building can be moved to a different location at the building site 304 or to a different building site.

The system 300 includes a plurality of power sources. The power sources provide power 305 (e.g. electricity) to the building 302, for example to power the operations of the building 302. The multiple power sources provide redundancy for the building 302. By having multiple available power sources that can generate and/or supply power for the building 302, the system 300 can analyze data related to the power sources and determine which available power source should supply power (i.e. the active power source) based on factors such as safety, reliability, cost, environmental impact, and the like. By doing so, the system 300 may deliver power more efficiently to the building 302.

The power sources include an onsite power source 306 and an offsite power source 308. The onsite power source 306 is located at the building site 304 in the generator building 307. The offsite power source 308 is located offsite 310. The power sources include an active power source and at least one inactive power source. The active power source supplies power to the building, while the inactive power source(s) does not.

In variations, the system 300 may include a plurality of onsite power sources 306 and/or a plurality of offsite power sources 308.

The onsite power source 306 may be a generator, such as a diesel generator or a natural gas generator. The onsite power source 306 may be a battery. The onsite power source 306 may be a solar power source. The onsite power source 306 may include a plurality of different power sources, such as two or more of the foregoing example onsite power sources.

The onsite power source 306 may require an input for generating power, such as a fuel (e.g. diesel, natural gas). The input may have an associated cost, which can be monitored by the system 300 and analyzed by a computer system (e.g. computer system 400 of FIG. 4, below).

The offsite power source 308 includes a public utility 316 (e.g. electricity, gas).

In an embodiment, the system 300 includes only the onsite power source 306 to reduce reliance on the public grid.

The system 300 may organize the power sources in a hierarchy. For example, the building 302 may have a primary power source and a secondary power source. In an embodiment, the primary and secondary power sources may both be onsite power sources 306 (e.g. natural gas and diesel generators). In another embodiment, the primary and secondary power sources may be an onsite power source 306 and an offsite power source 308, respectively. The primary and secondary power sources may be synchronized and redundant. Power source hierarchy data related to the power source hierarchy can be stored by the computer system and used in the analysis.

The system 300 may implement the power source hierarchy such that a higher ranked power source (e.g. primary power source) is the active power source for the building 302 unless a condition is detected by the computer system that warrants a switch to a lower ranked power source (e.g. secondary power source). The condition may be a failure of the active power source to meet a performance metric such as a threshold, performance band, or the like. The condition may be an inferior performance metric for the active power source compared to a corresponding performance metric for the inactive power source. The performance metric may be based on a single factor such as safety, cost, reliability, or environmental impact, or a combination of two or more such factors. The combination may involve a balancing of factors and may include applying a weighting to the factors in the combination.

Each available power source for the building 302 may include a control switch for enabling and disabling the power source, according to instructions from the computer system. The control switch may be part of a control subsystem 317.

As described above, the power source can be classified as active or inactive. An active power source can be considered enabled and supplies power 305 to the building 302. An inactive power source is considered disabled and is not supplying power to the building 302 (i.e. it may be prevented from supplying power to the building 302).

A transition from the power source being inactive to active initiated by the system 300 may be considered enabling the power source. Similarly, a transition from the power source being active to inactive initiated by the system 300 may be considered disabling the power source. In each case, the enabling or disabling of the power source is reversible.

The enabling and disabling of power sources may be controlled by the control subsystem 317 on the direction of the computer system. The computer system stores active power source data (e.g. active power source data 474 below). The active source data may include information on which power source is the active power source, which power source is the inactive power source, operating parameters of the active power source (e.g. on/off, input and output levels, switch state data), etc.

Each power source may have a switch state indicating whether the switch for supplying power to the building 302 is enabled or disabled (i.e. whether the power source the active source or the inactive source). The switch states of the onsite power source 306 and offsite power source 308 are stored (as switch state data) and monitored by the computer system.

The system 300 includes an offsite computing device 318 and an onsite computing device 320. The offsite computing device 318 and the onsite computing device 320 (and the functions performed thereby) may be collectively referred to as "computer system". The onsite computing device 320 is located at the building site 304 in building 302. The offsite computing device 318 is located at a system operator facility 323. The offsite and onsite computing devices 318, 320 are communicatively connected via a network 324. The network 324 may be a secure and/or private network.

Generally, the computer system collects data related to the power sources ("power source data" or "source data"), analyzes the data to determine a preferred power source for the building 304, and controls one or more onsite components according to the preferred power source determination.

The analysis and control tasks performed by the computer system may be allocated to the offsite and onsite computing devices 318, 320 in any suitable manner. In an embodiment, the offsite and onsite computing devices 318, 320 each analyze the power source data and the onsite computing device 320 controls onsite components according to the output of the analysis. The offsite computing device 318 may include a system image of the onsite computing device 320 or an aspect thereof.

The offsite computing device 318 may be managed by a system operator. The offsite computing device 318 implements an application integration platform (AIP) 328. The AIP 328 integrates and remotely manages, monitors, and dispatches generating, facility and balance of plant control systems. The AIP 328 may create secure, reliable, economic and environmental benefits for host client sites. The AIP 328 may enable the dispatch, operations, and maintenance functions to be conducted safely and autonomously or safely and remotely in real time.

The AIP 328 processes multiple digital inputs from many complex processes and may provide a simple-to-use reliable, remote intelligent management platform. The AIP 328 may perform any one or more of economic dispatch, severe weather reinforcement, facility load balancing, power export, emergency reaction/recover and power quality control. The AIP 328 creates an image of an engineering controls level allowing multiple stakeholders to safely use the system. The AIP 328 facilitates the convergence of internet and energy technologies.

The AIP 328 may provide security benefits. The AIP 328 creates an image of actual site from live and historical data. The AIP 328 can accept write instructions that are sent to a data base for further processing. The end user/site node (node) is not exposed or accessed directly by the internet client.

The AIP 328 may provide economic benefits. The AIP 328 may mitigate future utility supplied power increases and reduce client energy costs by autonomously optimizing the available relevant operational inputs.

The AIP 328 may provide environmental benefits. The AIP 328 may manages and controls available environmental and emissions output in real time creating optimal operating conditions The AIP 328 may provide reliability. The AIP 328 may provide reduced electricity supply risk due to multiple, built-in redundancies. The AIP 328 may have automatic severe weather and load balancing features. The AIP 328 monitors severe weather in real time and in advance of a storm and adjusts the host site to adapt to any weather-related events or outages. The AIP 328 may provide real time sensing of transient and dynamic conditions on the electrical grid enables appropriate load balancing to ensure system performs safely and efficiently. The AIP 328 may also operate on a variety of manufacturers equipment and inputs devices allowing quick and easy parts replacement The AIP 328 may include a communications module that provides administrative interface for configuring local and remote Ethernet and Serial Pathways and addressing. The communications module collects, concentrates and conditions raw data for output to a database module The database module compiles, manages, and populates databases. The database module provide persistent storage and customizable rollover archiving. The AIP 328 may include an administrative interface for configuring any one or more of data historians, administrative tools interface for database management, and file health and data integrity.

The AIP 328 may include a reporting module. The reporting module conditions data into client specific human readable formats. The reporting module provides custom tailored user-specific reporting. The reporting module facilitates access to historical data The AIP 328 may include a web app module. The web app module provides user-specified data via ethernet and internet to local and remote client devices. The web app module auto updates at specified refresh rates to display gathered real time data. The web app module provides limited but secure read/write access to configured intelligent end devices and components. The web app module provides user specific and requested data to a graphical user interface.

The AIP 328 may include a severe weather module. The severe weather module may provide a preconfigured user specific set-points for "one touch" command via the web app module The AIP 328 may include a node pinger module. The node pinger module provides an administrative tools interface for database management, file health and data integrity. The node pinger module notifies administrative personnel of site communications interruptions The AIP 328 may include an internet protocol (IP) check module. The IP check module monitors dynamic IP addresses for changes and provides system updates.

The AIP 328 may include a severe weather forecasting module. The severe weather forecasting module monitors and scrapes internet weather data in real time for configured sites and client specific locations. The severe weather forecasting module provides data to the web app module.

The AIP 328 may include a commodities module. The commodities module monitors commodities and provides data to web app module. The commodities module notifies specified users when prices rise above preset thresholds. The commodities module activates a dispatch process when prices rise above preset thresholds. The commodities module deactivates the dispatch process when prices fall below preset thresholds.

The AIP 328 may include an emissions module. The emissions module calculates raw emissions data acquired from sensors and endpoints. The emissions module provides data to the web app module.

The AIP 328 may include a load balancing module. The load balancing module provides real time sensing of transient and dynamic conditions on the electrical grid. The load balancing module enables appropriate load balancing to ensure system performs safely and efficiently.

The offsite computing device 318 receives data from external data sources 330. The offsite computing device 318 is communicatively connected to the external data sources 330 via a network 332, such as the Internet. The external data sources 330 may be websites, databases, or the like. The external data sources 330 may be associated with various stakeholders.

The external data sources 330 provide external data to the system 300. The external data is a subset of the power source data and can be associated with the onsite power source 306 or the offsite power source 308. The external data can be contrasted with building data, which is another subset of the power source data that is collected at the building site 304 and relates to building site conditions and use of power. The external data includes data other than building data that can impact one or more factors such as cost, reliability, and safety for the power source. Examples of external data include utility price data, utility demand data, weather data, generator input (e.g. fuel) price data etc.

The offsite computing device 318 may be communicatively connected one or more other system operator devices. The system operator devices may include a procurement team device and a building maintenance team device.

The procurement team device may be associated with a procurement team. The procurement team procures commodities for the building 302. The commodities may include inputs to the onsite power source 306, such as fuel. The offsite computing device 318 may communicate directly with the procurement team, such as by sending an instruction or message to an individual, or with a procurement team application.

The maintenance device may be associated with a maintenance team. The maintenance team may be concerned with predictive and reactive maintenance for the onsite power sources 306 or the general supply of power 305 to the building 302. Like with the procurement, the offsite computing device 318 may communicate directly with the maintenance team, such as by sending an instruction or message to a group or individual, or with a maintenance team application through which the maintenance team operates.

In each case the analysis performed by the offsite computing device 318 may generate a result that requires or implicates an action to be performed by the procurement team or maintenance team. In such cases, the offsite computing device 318 can automatically communicate with the appropriate team via the procurement or maintenance team devices. The system operator device may include an interface (e.g. API) for communicating with the AIP of the offsite computing device 318. The procurement team and maintenance team may be agents of the system operator such action can be taken according to the determinations of the system 300 (e.g. to effect a power source change) without requiring the input or action of the user/client.

The onsite computing device 320 is located at the building site 304 in building 302. The onsite computing device 320 communicates with digital control system (DCS) 334. The offsite computing device 318 may include a system image of the digital control system 334.

The DCS 334 may be a robust, standalone, network connected device that can perform simple or complex PID (proportional-integral-derivative) control based on feedback. The output of a process is measured by the DCS 334 and compared with the set point. If a difference is detected a correction is calculated and applied. The output is measured again, and any required correction recalculated. The DCS 334 controls many individual processes including any one or more of speed, temperature, and flow. The DCS 334 includes PID control loops, minimum memory, analog inputs/outputs, digital input/outputs, serial communications.

The onsite computing device 320 receives data from various onsite data sources. The onsite data sources include subsystems 336 and intelligent end devices 338. The onsite computing device 320 is communicatively connected to the onsite data sources via a network. The network may be a local area network (LAN).

The onsite data sources provide building data to the system 300. The building data is a subset of the power source data and can be associated with the onsite power source 306 or the offsite power source 308. The building data may relate to the conditions of the building 302 or building site 304, the use of power by the building 302, the operation of various onsite components such as the control subsystem 317 (described below), etc.

The intelligent end devices 338 collect and provide intelligent device data to the onsite computing device 320. The onsite computing device 320 may transmit the intelligent device data to the offsite computing device 318 for analysis or may analyze the intelligent device data itself.

The building site 304 may include a plurality of types of intelligent end devices 338 for collecting different data. The intelligent end devices 338 may include balance of plant (BOP) equipment. The intelligent end devices 338 may include supporting components and auxiliary equipment for delivering power other than the onsite power source (e.g. generator) itself. Examples of intelligent end devices 338 include HVAC and protection relay equipment. The intelligent device data may include temperature data (inside and outside), electrical characteristics such as voltage, current, harmonics, or the like, breaker status, HVAC data, etc.

The subsystems 336 collect and provide subsystem data to the onsite computing device 320. The onsite computing device 320 may transmit the subsystem data to the offsite computing device 318 for analysis or may analyze the subsystem data itself.

The subsystem 336 may be a simple transmitter. The transmitter may be a temperature transmitter, a pressure transmitter, a frequency transmitter, a heat transmitter, a fire or flame detector, a smoke detector, or the like. The transmitter may be an analog or digital device. The subsystem 336 transmits the collected subsystem data to the onsite computing device 320 (e.g. DCS 334). The subsystem 336 may transmit the data directly to the onsite computing device 320 or to an intelligent end device 338 which then transmits the data (in the same form or a processed form) to the onsite computing device 320.

The intelligent device data and subsystem data are provided to the offsite computing device 318 (e.g. AIP 328) via the onsite computing device 320 (e.g DCS 334).

The onsite computing device 320, intelligent end devices 338, and subsystems 336 may communicate with each other via a multi-platform interface.

The system 300 also include a control subsystem 317. The control subsystem 317 is located at the building site 304. Components of the control subsystem 317 may be distributed in the building 302 and the generator building 307.

The control subsystem 317 is communicatively connected to the computer system via the onsite computing device 320. The control subsystem 317 is also communicatively connected to the power sources 306, 308 via the local area network. The control subsystem 317 may be communicatively connected to additional onsite components via the local area network.

The control subsystem 317 controls the generation and supply of power by the plurality of power sources. The control subsystem 317 controls the various onsite components to ensure generation and supply of power to the building 302 in accordance with the determinations made by the computer system. The control subsystem 317 may control the safe operation and supply of power by the power sources.

Generally, the control subsystem 317 receives data from the onsite computing device 320 related to the preferred power source determination and may adjust the power source in accordance with the determination. The control subsystem 317 may receive a control instruction from the computer system. The control instruction may include a control action based on the preferred power source determination. The control subsystem 317 may adjust an operating parameter of the power source or power sources according to the control instruction. The operating parameter may include the on/off state of the power source (e.g. if the power source is active/enabled or inactive/disabled), the output level of the power source, etc. In a simple case, the control subsystem 317 may receive a control instruction to enable the inactive power source and disable the active power source. The control subsystem 317 may the adjust the operating parameters of the active and inactive power sources in order to effect the active power source change.

The control subsystem 317 (or a component thereof) may be implemented using a programmable logic controller (PLC). The control subsystem 317 may store and run software for controlling the onsite components responsible for the generation and delivery of power to the building 302.

In an example, the control subsystem 317 may receive a preferred power source indication from the onsite computing device 320 and send instructions to the appropriate onsite devices to implement the power source switch (e.g. disable the active power source and enable an inactive power source).

Figure 4:
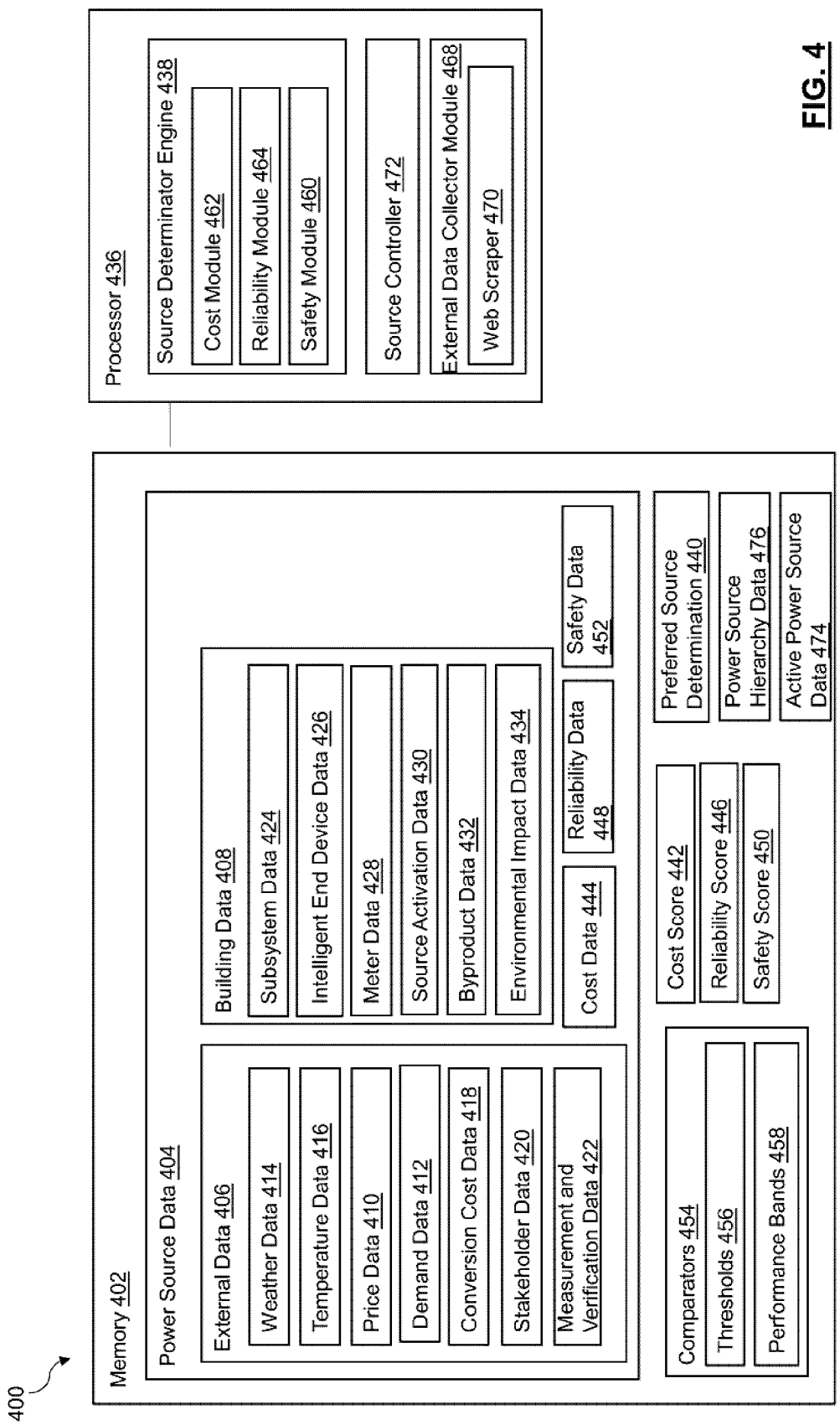
FIG. 4 is a block diagram of a computer system for intelligently supplying power to a building, according to an embodiment.

Referring now to FIG. 4, shown therein is a computer system 400 for analyzing power source data, according to an embodiment. The computer system 400 can be used to intelligently generate and supply power at a building, such as building 302 of FIG. 3. The computer system 400 may optimize efficient generation and supply of power by reducing costs, increasing reliability, and maintaining safe operation.

The computer system 400 may be a distributed computing system, wherein various components and tasks of the computer system 400 are distributed across a plurality of computing devices. In a particular case, the computer system 400 includes an onsite computing device and an offsite computing device (e.g. onsite computing device 306 and offsite computing device 308 of FIG. 3) in communication with each other.

The computer system 400 includes a memory 402 for storing power source data 404. The memory 402 may be stored at the onsite computing device, the offsite computing device, or at both onsite and offsite devices.

The power source data 404 includes data about an available power source for the building 302. The power source may be the onsite power source 306 or the offsite power source 308. By analyzing the power source data 404, the computer system 400 can determine which power source is the preferred source to supply the building 302 based on one or more factors.

In an embodiment, the computer system 400 analyzes power source data 404 for the offsite power source 308 and power source data 404 for the onsite power source 306 and determines the preferred power source for the building 302.

In another embodiment, the computer system 400 analyzes power source data 404 for multiple onsite power sources 306 and determines the preferred power source for the building 302. Variations having only onsite power sources 306 may advantageously reduce reliance of the building 302 on public utilities.

The power source data 404 includes external data 406 and building data 408.

The external data 406 may be provided to the computer system 400 via one or more offsite devices belonging to one or more external, offsite non-user sources (e.g. third parties).

The building data 408 is provided to the computer system 400 via one or more onsite devices at the building site 304, such as the subsystems 332 and the intelligent end devices 336.

The building data 408 may relate to the use of power by the building, local environmental conditions of the building 302 or building site 304, the operation of various onsite components and subsystems, or the like.

The building data 408 may be collected by the subsystems and intelligent end devices (or other onsite component) and transmitted to the onsite computing device 320 via the local area network. The onsite computing device 320 may transmit the building data 408 to the offsite computing device 308 via the network 324.

The external data 406 may be only stored only in the memory 402 of the offsite computing device 308. The building data 408 may be stored in the memory 402 of the onsite and offsite computing devices 306, 308.

The external data 406 includes power source price data 410 (or price data 448). The price data 448 may include public utility rates. Public utility rates may vary according to time of date, day of week, or usage. The price data 448 may include fuel prices (or other inputs to onsite power generation) such as natural gas prices, diesel prices, etc.

The external data 406 includes utility demand data 412. Demand on utility may be correlated with a price change for the utility. For example, an increase in demand on the utility often precedes an increase in the price of the utility. Utility demand data 450 may thus provide insight into the cost of a particular power source.

The external data 406 includes weather data 414.

The external data 406 includes temperature data 416.

The external data 406 may include conversion cost data 418.

The external data 406 includes stakeholder data 420 and measurement and verification (M&V) reporting data 422.

The building data 408 includes subsystem data 424. The subsystem data 422 is generated and provided to the computer system 400 by the subsystems 332. The subsystems may include one or more sensors for generating the subsystem data 424. The subsystem data may include temperature data, pressure data, frequency data, flow data, smoke detector data, fire and flame detector data, heat data, etc.

The building data 408 includes intelligent end device data 426 (or intelligent device data 426). The intelligent end device data 426 is generated by intelligent end devices 336.

The building data 408 includes power meter data 428 (or meter data 428). The meter data 428 may include utility power meter data, building power meter data, and generator power meter data.

The power source data 404 may include power source activation data 430 (or activation data 430). The activation data 430 may include start-up time data and activation cost data.

The start-up time data may include how long it takes for the power source to supply power once switched on. The start-up time data 444 for a power source may be a deterring factor for changing the active power source.

The activation cost data may include data on costs associated with switching the power source to an on state from an off state. A high activation cost may be a deterrent to switching a power source on (i.e. changing the active power source).

The building data 408 may include byproduct data 432. The onsite power source 306 may generate heat as a byproduct when supplying power. b may include data on positive or negative byproducts generated from use of the power source. For example, the onsite power source 306 (e.g. a generator) may generate heat as a byproduct. The heat byproduct may be used to provide heat to the building. Using the heat byproduct as a heat source may reduce overall costs for the building operator. The byproduct data may be collected by the subsystems 336 or the intelligent end devices and provided to the computer system 400 for analysis.

The building data 408 may include environmental impact data 434 (or environmental data). The environmental data includes data on the environmental impact of activating and operating the power source, such as emissions (e.g. carbon emissions). The environmental data may be collected by the subsystems or intelligent end devices.

The computer system 400 includes a processor 436 including a power source determinator engine 438 (or source determinator 438). The source determinator 438 is configured to determine a preferred power source 440 for the building 302 from the external data 406 and the building data 408. The preferred power source determination 440 is stored at memory 402.

The source determinator 438 may determine the preferred source 440 based on factors such as maintaining safe operation, reducing cost, increasing reliability, or decreasing environmental impact, or some balance of two or more factors. The source determinator 438 may use machine learning and artificial intelligence to generate the preferred power source 440.

The processor 438 may be located at the onsite computing device 306 at the offsite computing device 308, or at both the onsite and offsite computing devices 306, 308.

The source determinator 438 may generate a cost score 442 for the power source from power source cost data 444. The cost data 444 is a subset of the power source data 404 and may include external data 406 and building data 408 related to the cost of generating and supplying power using the power source.

The source determinator 438 may generate a reliability score 446 for the power source from power source reliability data 448. The reliability data 448 is a subset of the power source data 404 and may include external data 406 and building data 408 related to the reliability of generating and supplying power using the power source.

The source determinator 438 may generate a safety score 450 for the power source from power source safety data 452. The safety data 452 is a subset of the power source data 404 and may include external data 406 and building data 408 related to the safety of generating and supplying power using the power source.

The source determinator 438 may apply a weighting at one or more stages of analyzing the power source data 404. For example, one or more outputs of the source determinator 438 may have a weighting applied to the output as part of the analysis and comparison of available power source. The application of the weight to the output may generate a weighted score. The weighted score is stored in the memory 402. In an example, the source determinator 438 generates the cost score 442 and a reliability score 446 for the power source. The cost score 442 is derived from analyzing the cost data 444. The reliability score 446 is derived from analyzing the reliability data 448.

The source determinator 438 may determine the preferred power source 440 by comparing a current parameter value for the building 302 with a comparator 454. The comparator 454 may be a threshold 456, performance band 458, etc. The comparator 454 is stored in the memory 402.

The threshold 456 may be, for example, more than 500 run hours on a generator will change a generator to a lower preference in start list and greater than 1000 hour difference will also initiate start and switch to a lower hour machine.

The threshold 456 may be, for example, if building load is greater than selected safety threshold of generator 1 then generator 2 is started.

The threshold 456 may be, for example, where voltage power quality has deviated more than 3% on generator 1 and generator 2 shows a fault then start generator 3 with alert and generator priority change.

In the case of a threshold 456, one or more outputs of the source determinator 438 may be compared with the threshold 456 to determine whether or not the power source meets the threshold 456. If the power source does not meet the threshold 456, the power source may be disqualified or discounted for selection as the preferred power source 440. For example, the computer system 400 may include a reliability threshold for the offsite power source 308 (e.g. public utility 316). The source determinator 438 may perform a reliability analysis for the onsite and offsite power sources 306, 308, based on reliability data. The reliability analysis may generate a reliability score 446. If the reliability score 446 falls below the threshold 456 for reliability for the power source, the source determinator 438 may disqualify the power source from selection as the preferred source 440.

The source determinator 438 may include a safety module 460. The safety module 460 analyzes safety data 452 and determines whether the power source can operate safely. The safety data 452 may be compared to a safety threshold or other safety-related comparator. If the power source does not meet the safety threshold, the source may be disabled and another source may be enabled. The safety threshold may be informed by legal requirements, regulations, industry practices, etc.

The source determinator 438 may be configured to prioritize the output of the safety module 460 in determining the preferred power source 440. For example, if the power source does not meet the safety threshold, the outputs of other modules (e.g. cost module, reliability module) may be disregarded.

The source determinator 438 may include a cost module 462. The cost module 462 may analyze cost data 444 and generate the cost score 442 for each source. The cost data 444 may be a subset of the power source data 404 and may include various external data 406 and/or building data 408. For example, the cost data 444 may include price data 410 (e.g. utility, fuel input), activation cost data, conversion cost data 418, byproduct data 432, etc.

The cost module 462 may compare the cost scores 442 for the onsite and offsite power sources 306, 308 and output the preferred power source 440 using a cost-based determination. The cost module 462 may generate a ranking of the cost scores 442.

The cost module 462 may use a cost threshold. The cost module 462 compares the cost score 442 with the cost threshold. In some cases, only power sources with cost scores 442 meeting the cost threshold can be the preferred power source 462.

The source determinator 428 includes a reliability module 464. The reliability module 464 may analyze reliability data 448 and generate a reliability score 446 for each source. The reliability data 448 may be a subset of the power source data 404 and may include various external data 406 and/or building data 408. For example, the reliability data 448 may include weather data 414 and temperature data 416.

The reliability module 464 may compare the reliability score 446 for the onsite and offsite power sources 306, 308 and output the preferred power source 440 based on reliability. The reliability module 464 may generate a ranking of the reliability scores 446. Interruption of service can produce negative effects for the user due to prevent discontinuity of daily activities or disruption of business operations. The reliability module 464 can help provide a reliable source of power to the building 302 for daily activities and operations.

The reliability module 464 may use a reliability threshold. The reliability module 464 compares the reliability score 446 with the reliability threshold. In some cases, only power sources with reliability scores 446 meeting the reliability threshold can be the preferred power source 440.

The source determinator 438 may be configured to perform additional analysis using the cost and reliability module outputs 442, 446. For example, the reliability and cost module outputs 442, 446 may be combined, balanced, or weighted to determine the preferred power source 440 based on multiple factors.

The processor 436 includes an external data collector module 468. The external data collector 468 collects external data 406 from various external data sources (e.g. external data source X of FIG. 3). The collected external data 406 is provided to the source determinator 438 for analysis.

The external data collector 468 may be configured to perform a web scraping or web data extraction function to extract data from websites. A web scraper 470 may access the World Wide Web directly using the Hypertext Transfer Protocol, or through a web browser. The external data 406 may be gathered and copied from the web and stored in a local database.

Figure 5:
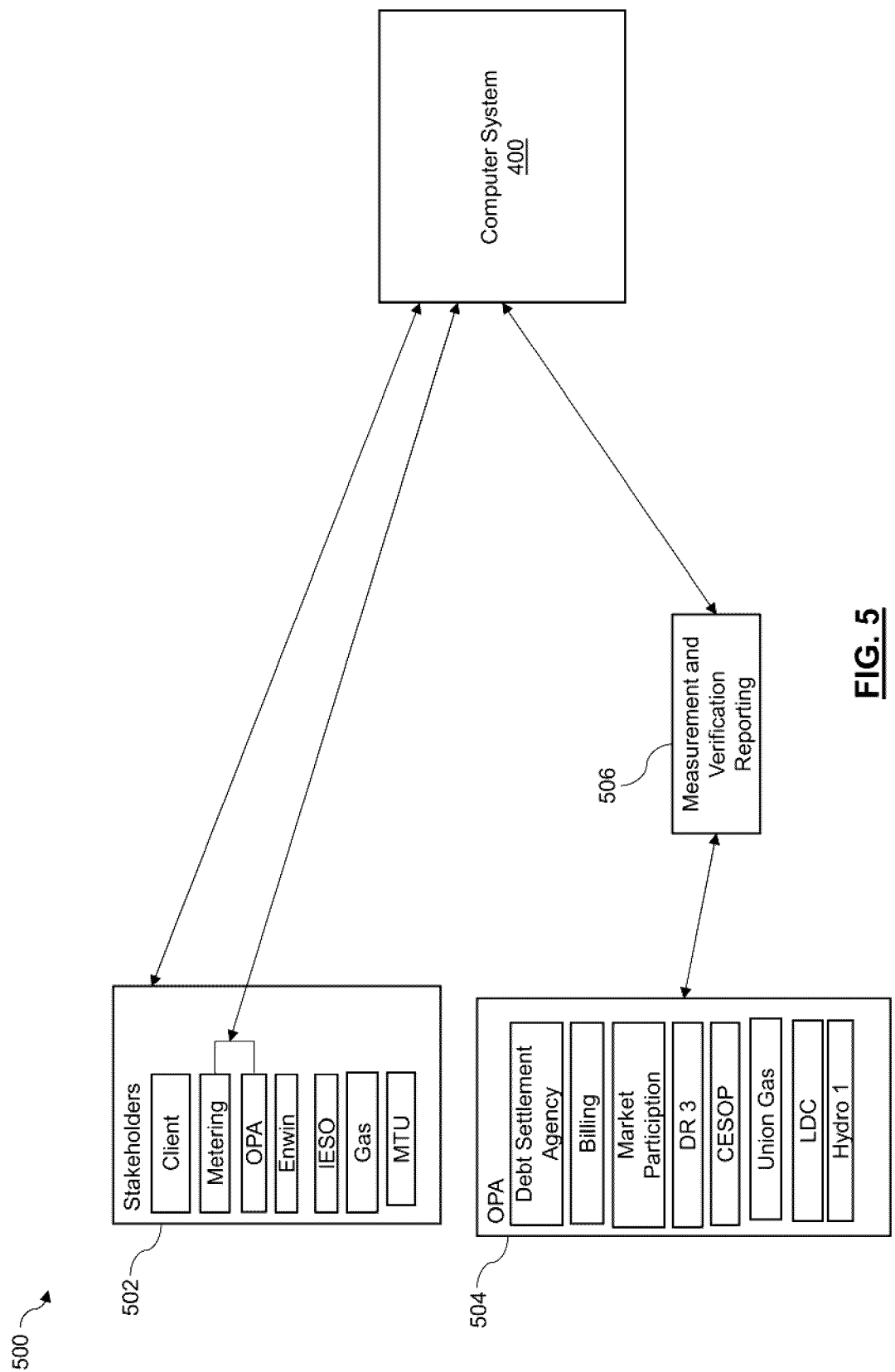
FIG. 5 is a block diagram of external data sources for input into the computer system of FIG. 4.

FIG. 5 illustrates various potential external data sources 500, according to an embodiment. The data sources include data from stakeholders 502. The stakeholder data may be collected by the computer system 400 from websites (or another data source such as a database) associated with the stakeholders 502, for example by the external data collector module.

The stakeholder data sources 502 include metering, power authority (OPA), electricity system operator, Enbridge, gas source, electricity distribution company, measurement and verification. The stakeholder data and MV data may be taken from websites. The stakeholder data 408 may include metering data 412, power authority (OPA) data 414, electricity system operator data 416, gas source data (e.g. Enbridge™) 418, and electricity distribution company data 420.

The external data sources 500 also include data from the Ontario Power Authority (OPA) 504 and measurement and verification (M&V) reporting 506.

Referring again to FIG. 4, the processor 436 includes a source controller module 472. The source controller 472 receives the preferred power source determination 440 from the source determinator 438. The source controller 472 compares the preferred power source with the active power source by comparing the preferred power source determination 440 with the active power source data 474. If the preferred power source is different from the active source, the source controller 472 may send a signal to the control subsystem 317 to disable the active source and enable the preferred source.

In an embodiment, the source controller 472 receives the preferred power source determination 440 from the source determinator 438, compares the preferred power source determination 440 with the active power source data 474, and generates a control instruction based on the comparison of the preferred power source determination 440 with the active power source data 474.

In other embodiments, the source controller 472 may generate an alert or message and display the alert via a user interface. The alert may request user input to confirm the power source change. Upon confirmation, the source controller 472 sends a signal to the control subsystem to implement the change. The control signal outputted by the source controller 472 may switch the active source or change one or more parameters of the active source. The new active source data 474 is stored in the memory 402 and can be referred to by the source controller 472 in a future operation.

Figure 6:
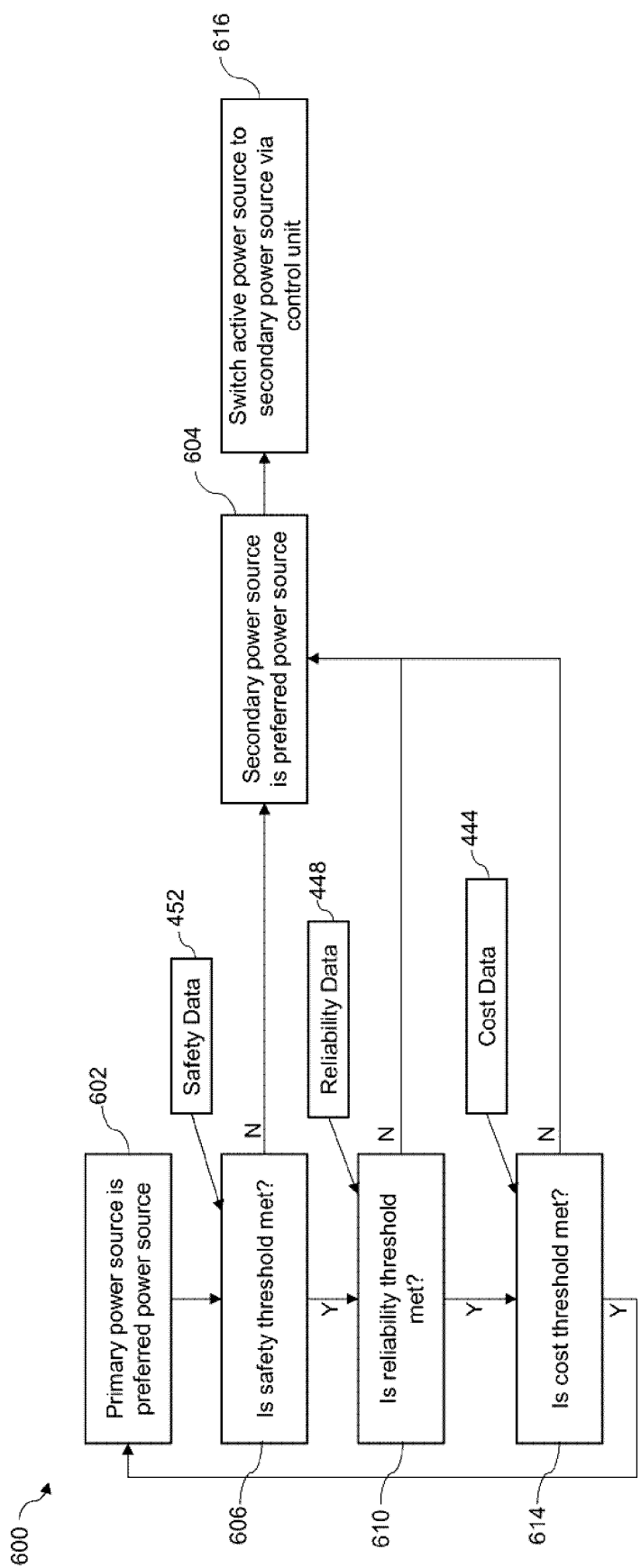
FIG. 6 is a flow diagram of a method for determining a preferred power source for a building, according to an embodiment.

Referring now to FIG. 6, shown therein is a flow diagram illustrating a process 600 for determining a preferred power source, according to an embodiment. The process 600 may be used for determining preferred power source 440 of FIG. 4. The process 600 can be implemented by the processor 436 of FIG. 4, for example using the source determinator 438.

The process 600 uses a power source hierarchy. The power source hierarchy may be stored as power source hierarchy data 476 in the memory 402. The hierarchy includes a primary power source 602 and a secondary power source 604. In other embodiments, the hierarchy may include additional power sources. The additional power sources may be ranked at the same level in the hierarchy as the secondary power source 604 (i.e. an additional secondary power source) or may be ranked lower (i.e. tertiary power source, quaternary power source, etc.). In other embodiments, the process 600 may modified as necessary and used without a power source hierarchy.

The primary power source 602 may be a default power source for the building 302. The default power source is the active power source (i.e. the preferred power source) for the building unless a condition is met requiring a switch to another power source (e.g. the secondary power source 604). The hierarchy of power sources for the building may be stored in memory 402.

The source determinator 438 may determine the preferred power source 440 by comparing a current parameter value for the building 302 with a comparator 454. The comparator 454 may be a threshold 456, performance band 458, etc. The comparator 454 is stored in the memory 402.

The current parameter value may be raw data received from an onsite data source (e.g. subsystem 332, intelligent end device 334) or an external data source 300, or may be an output of the source determinator 438. The foregoing may be attributed to the fact that in some cases the raw data may itself be able to provide insight into the current state of power generation and supply, while in other cases it is only after the raw data has been analyzed in light of other raw data that insight into the current state of the power generation and supply can be gained.

At 606, the source determinator 438 receives safety data 452 and analyzes the safety data 452 to determine whether a safety threshold is met. The safety threshold may be specific to the building 302 (or user/client) or may be a universal threshold applied to all buildings. The safety threshold may be stored in the memory 402. The safety threshold may relate to a plurality of safety conditions, determinable from the safety data 452, that indicate an unsafe condition (or a potential unsafe conditions). The safety threshold may include a plurality of safety-related thresholds.

Generally, the safety data 452 includes data relevant to the safe operation of the primary power source 602 and the generation and supply of power to the building. The safety data 452 may be a subset of the building data 408. In some cases, such as where the primary power source 602 is an offsite power source 310 (e.g. public utility), the safety data 452 may include a subset of external data 406, which may be in addition to the building data 408. In an example, the safety data 452 may include subsystem data 424 or intelligent device data 426 such as the status of breakers (e.g. open, closed) at the building site 304. The status of a breaker (e.g. open) may indicate the presence of a safety condition. The safety data 452 may also include electrical data from the building site 304 such as voltages, currents, harmonics, etc., which can be related to or predictive of an unsafe condition.

The source determinator 438 determines if the safety threshold is met. If the safety threshold is met, the primary power source 602 continues to generate and supply power 305 to the building 302. If the safety threshold is not met, the secondary power source 604 is selected as the preferred power source 440 for the building 302. The source determinator 438 may compare the preferred power source 440 to active power source data 474 and, upon determining the preferred and active power sources are different, send a signal to the control subsystem 317 to switch the secondary power source 604 on and the primary power source 602 off, as needed.

At 610, the source determinator 438 receives reliability data 448 and analyzes the reliability data 448 to determine if a reliability threshold is met. The reliability threshold may be specific to the building 302 (or the user/client) or may be a universal reliability threshold applied to all buildings. The reliability threshold may be stored in memory 402. The safety threshold may relate to safety conditions, determinable from the reliability data 512, that indicate an unreliable condition for the power source.

Generally, the reliability data 448 includes data relevant to the reliable operation of the primary power source 602 and the generation and supply of power 305 to the building 302. An unreliable condition may indicate a likelihood that the primary power source may be interrupted in some manner (e.g. blackout, brownout). The reliability data 448 may include a subset of the building data 408, a subset of the external data 406, or both. In an example, the reliability data 512 may include weather data 414. Weather data 414 (e.g. current or projected weather) may indicate a current or impending weather condition that may render the primary power source 602 inoperable (i.e. an unreliable condition). Instead of waiting for the weather condition to negatively impact the operation of the primary power source 602, the source determinator 438 may advantageously detect an unreliable condition and initiate a preemptive switch to the secondary power source 604 in order to limit the negative impact (e.g. reduce downtime).

The source determinator 438 determines if the reliability threshold is met. If the reliability threshold is met, the primary power source 602 continues to generate and supply power 305 to the building 302. If the reliability threshold is not met, the secondary power source 604 is selected as the preferred power source 440 for the building 302. The source determinator 438 may compare the preferred power source 440 to the active power source data 474. In another embodiment, the comparison may be performed by the source controller 472. Upon determining the preferred and active power sources 440, 474 are different, the source controller 472 sends a signal to the control subsystem 317 to enable the secondary power source 604 on and disable the primary power source 602, as needed.

At 614, the source determinator receives cost data 444 and analyzes the cost data 444 to determine if a cost threshold is met. The cost threshold may be specific to the building 302 (or the user/client) or may be a universal cost threshold applied to all buildings. The cost threshold may be stored in the memory 402. The cost threshold may relate to economic or business-related concerns that indicate the secondary power source 604 is preferred over the primary power source 602 based on economic or cost-driven factors.

Generally, the cost data 444 includes data relevant to the economically efficient operation of the primary power source 602 and the generation and supply of power 305 to the building 302, particularly as compared to the secondary power source 604. The cost data 444 may include a subset of the building data 408, a subset of the external data 406, or both. In an example, the primary power source 602 may be an offsite power source 310 such as a public utility and the secondary power source 604 may be an onsite power source 308 such as a generator. The cost data 444 may include utility price data 410 or utility demand data 412. An increase in utility demand often precedes an increase in utility price. The cost data 444 may include data related to costs associated with a generator input fuel and start-up costs. The cost data 444 may also include heat byproduct data 432 for the onsite power source 308 (i.e. the secondary power source 604). Heat byproduct from the onsite power source 308 may offset some of the cost associated with starting and running the generator.

The source determinator 438 determines if the cost threshold is met. Applying the threshold may include comparing the costs associated with the primary power source 602 with the secondary power source 604 and determining if the difference exceeds the threshold. If the cost threshold is met, the primary power source 602 continues to generate and supply power 305 to the building 302. If the cost threshold is not met for the primary power source 602, the secondary power source 604 is selected as the preferred power source 440 for the building 302. The source determinator 438 may compare the preferred power source 440 to the active power source data 474. Upon determining the preferred and active power sources 440, 474 are different, the source controller 472 may send a signal to the control subsystem 317 to enable the secondary power source 604 and disable the primary power source 602, as needed.

The thresholds may be prioritized such that the source determinator evaluates the thresholds 456 (or other comparator 454) in a serialized order (e.g. as shown in process 600). Serial evaluation of thresholds 456 may be implemented to prioritize evaluations based on criticality. For example, it may not be particularly relevant if cost data 444 indicates maintaining the primary power source 602 is preferred if the safety threshold for the primary power source 602 is not met. In such a case, it is more important that the active power source data 474 (i.e. the primary power source 602) is switched to the secondary power source 604 in order to maintain safe operation and supply of power 305 to the building 302. In variations, thresholds 456 or other comparators 454 may be prioritized on the preferences of the user or according to legal or regulatory requirements. In some embodiments, the source determinator 438 may evaluate multiple thresholds 456 in parallel instead of in serial (or sequentially).

In another embodiment, the source determinator 438 may include a threshold 456 associated with an additional factor or consideration, such as environmental threshold. The environmental threshold may consider environmental impacts of the primary power source 602.

Various thresholds 456 may be weighted differently. Such differential weighting may vary from building to building.

A threshold 456 may include an associated response or action. For example, the threshold 456 may have a first associated action for when the threshold is met or exceeded and a second associated action for when the threshold is not met. In some cases, the associated action may be no action (e.g. if the threshold is not met). The associated action may be carried out by the computer system 400 (e.g. via the source controller 474) in communication with the control subsystem. The associated action can be stored in the memory 402.

The associated response may be automatic or require human intervention (e.g. by an operator). Whether the associated response is automatic or not may relate to the criticality of the threshold. For example, exceeding a safety threshold may be critical and warrant and automatic associated response to ensure safe operation, while exceeding a cost threshold (or performance band) may be less critical and may require human input to carry out the associated response. In an example, the automatic response may be an automatic switch to the secondary power source 604 from the primary power source 602. In another example, the non-automatic response may include a prompt or alert generated by the computer system 400 (e.g. source controller 472) suggesting or requesting human intervention in changing from the primary power source 602 to the secondary power source 604. In an embodiment, the safety threshold includes an automatic associated response and the cost threshold does not. The cost threshold may include a prompt requesting or suggesting human intervention.

At 616, the active power source is switched to the secondary power source (in response to the determination at 604) via the control unit. As a result, the secondary power source becomes the active power source for the facility.

In another embodiment, the source determinator 438 may use a performance band or bands 458 as a comparator 454. The performance band 458 may be used instead of or in addition to a threshold 456 for a given factor (e.g. safety performance band, cost performance band, etc.). The performance band 458 is stored in memory 402.

The performance band 458 may correspond to a range of data values associated with a particular performance level. In the case of an optimum performance band, the range may be an acceptable range. In variations, a factor (e.g. safety) may have a plurality of performance bands, which may each have different associated responses.

Similar to a threshold 456, a performance band 458 may be associated with a response. Responses may be different for different performance bands 458 across different factors (e.g. safety, reliability, cost). Responses may be different for different performance bands 458 within the same factor (e.g. safety).

In an example, the source determinator 438 may include multiple safety performance bands. The safety bands may include a first safety band, a second safety band, and a third safety band. The first band may represent a safe condition for the power source. The second band may represent a caution condition for the power source. The third band may represent an unsafe condition for the power source. Data falling within the second band may be linked to an alert or prompt, while data falling within the third band may result in an automatic control action taken by the system (e.g. via the source controller 472 and the control subsystem).

Figure 7:
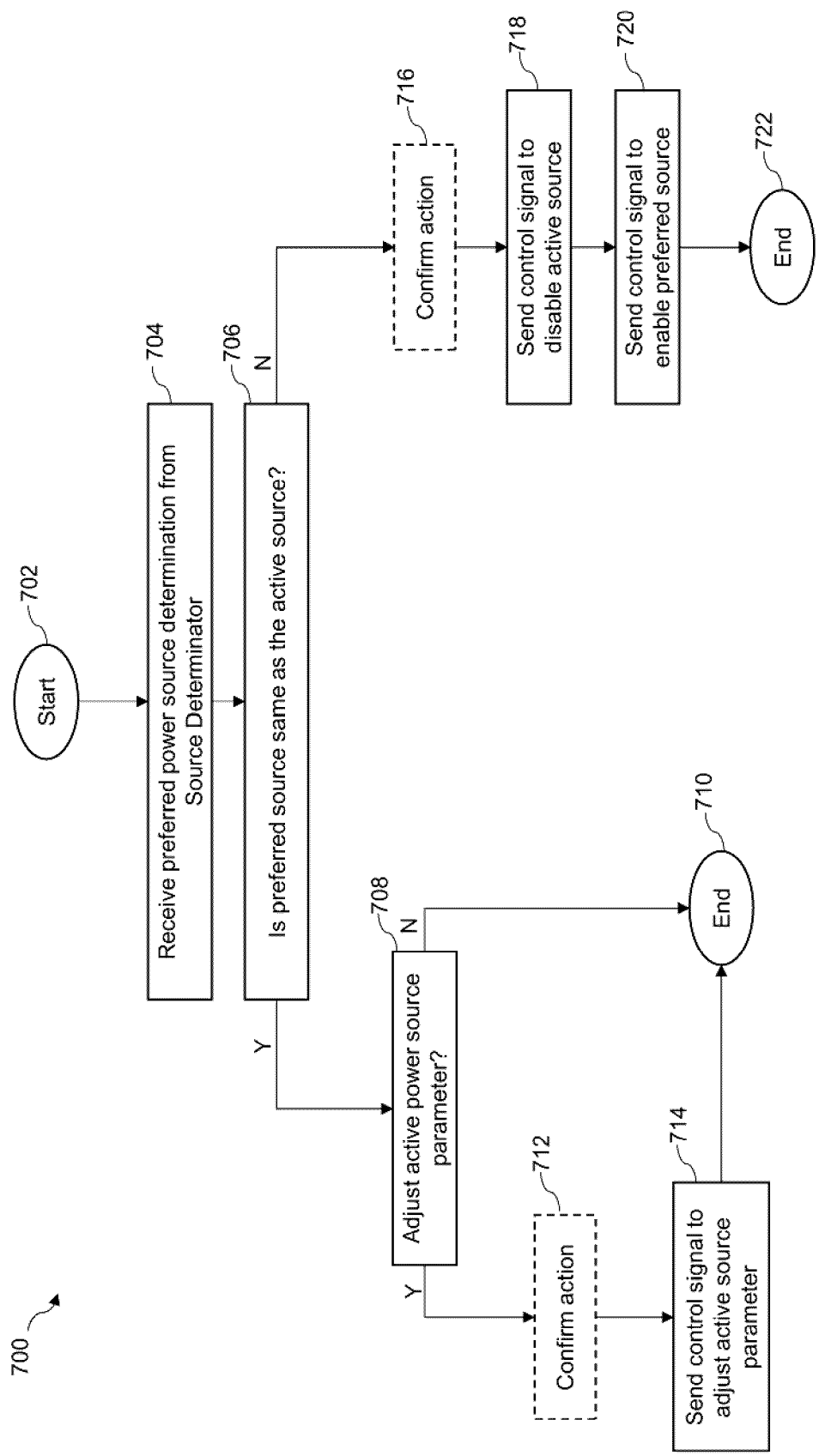
FIG. 7 is a flow diagram of a method for controlling a power supply for a building, according to an embodiment.

Referring now to FIG. 7, shown therein is a process 700 for controlling the power supply of the building 302, according to an embodiment. The process 700 may be implemented by the computer system 400, for example using the source controller 472.

The process 700 starts at 702 and proceeds to step 704.

At 704, the source controller 472 receives the preferred power source determination 440 from the source determinator 438.

At 706, the source controller 472 determines whether the preferred power source and the active power source are the same by comparing the two preferred power source determination 440 with the active power source data 474.

At 708, if the source controller 472 determines that the preferred power source is the same as the active power source, the source controller 472 determines whether the preferred power source determination 440 includes any power source parameter data. The source controller 472 compares the parameter data with active source parameter data in order to determine whether any parameters should be adjusted. The parameter data may relate to one or more operating parameters of the power source.

At 710, the process 700 ends and no action in taken by the computer system 400 if the source controller 472 determines no parameter adjustments are necessary for the active source 474.

Optionally, at 712, if the source controller 472 determines that a parameter of the active source should be adjusted, the source controller 472 may request confirmation from a human operator. The source controller 472 may generate an alert or prompt that can be displayed via user interface or sent to an operator device. The alert may request or suggest the human operator confirm the proposed action to adjust the parameter.

At 714, the source controller sends a signal to the control subsystem to adjust the parameter.

Optionally, at 716, if the source controller 472 determines that the preferred source 440 is different from the active source 474, the source controller 472 may request confirmation from a human operator. The source controller 472 may generate an alert or prompt that can be displayed via user interface or sent to an operator device. The alert may request or suggest the human operator confirm the proposed action to change the active power source. The alert may include details on the basis for the proposed change.

At 718, the source controller 472, having determined the preferred source 440 is different from the active source, sends a signal to the control subsystem to disable the active power source.

At 720, the source controller 472 sends a signal to the control subsystem to enable the preferred power source 440 (which then becomes the active source).

In an embodiment, the steps 718 and 720 may be performed simultaneously or near-simultaneously. In another embodiment, the steps 718 and 720 may be performed with a single action that changes the active power source to the preferred power source (i.e. both disables the active source and enables the preferred source).

At 722, the process 700 ends with the active power source in its new state. The process 600 may be repeated upon receiving another preferred power source determination 440 from the source determinator 438. In some cases, the process 700 may be performed at regular intervals.

Figure 8:
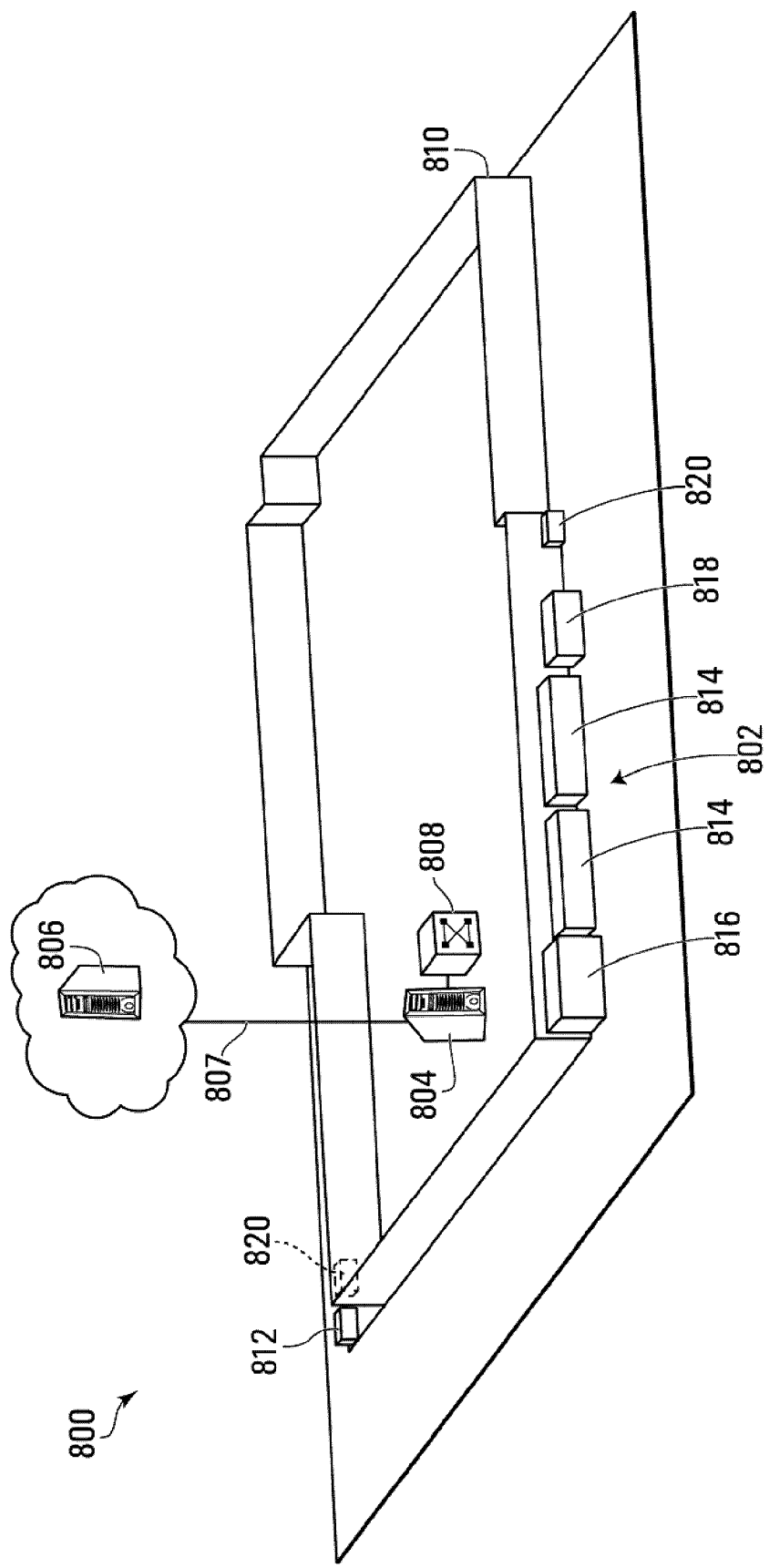
FIG. 8 is a perspective view of a building site having an intelligent power supply system, according to an embodiment.

Referring now to FIG. 8, shown therein is a perspective view of a building site 800 having an onsite power source 802, according to an embodiment. The onsite power source 802 may be onsite power source 306.

The onsite power source 802 is controlled by a computer system configured to intelligently provide power to the building (e.g. computer system 400 of FIG. 4, onsite and offsite computing devices 318, 320 of FIG. 3). The computer system enables the intelligent selection of a power source from a plurality of available power source options.

The computer system includes an onsite computing device 804 and an offsite computing device 806. The offsite computing device 806 is located offsite at a system operator facility. The onsite and offsite computing devices 804, 806 communicate with one another via a secure network 807.

The onsite computing device 804 is communicatively connected to a control unit 808. The control unit 808 controls various onsite components, including the onsite power source 802, via a control subsystem. The control unit 808 operates on control instructions from the onsite computing device 804. The control instructions are generated via analysis of power source data by the computer system. The onsite computing device 804 is connected to the control unit 808 via a local area network. The onsite power source 802 is communicatively linked to the control unit via the local area network. The onsite power source 802 may be communicatively connected to the onsite computing device 804 via the local area network.

The site 800 includes an industrial facility 810 (or facility 810). The facility 810 receives and uses power from the onsite power source 802 on the direction of the computer system. The facility 810 may receive and use power supplied by the onsite power source 802 or by an offsite power source (not shown). The offsite power source may be a public utility.

The site 800 includes an existing transformer 812. The existing transformer 812 is a utility power stepdown transformer and transforms utility transmission high voltage to a lower building bus voltage The onsite power source 802 is portable. The onsite power source 802 may thus be positioned in a convenient location on the site 800 around the facility 810. The onsite power source 802 may include a plurality of structures for housing one or more components of the onsite power source 802. For example, the structure may be an intermodal container. The intermodal container may be repurposed or adapted as necessary.

Advantageously, if the onsite power source 802 needs to move to a new location (whether within the site 800 or to a second site), the structures making up the onsite power source 102 (including the housed components) can be transported to the new location and reassembled or repositioned as necessary.

The onsite power source 802 includes a natural gas generator 814 and a diesel generator 816. In another embodiment, the onsite power source 802 may include battery, solar, and/or trigeneration technologies for generating and supplying energy to the facility 810. In some cases, the onsite power source 802 may be configured to perform carbon sequestration.

The natural gas generator 814 is a primary power source for the facility 810. The diesel generator 816 is a secondary power source for the facility 810.

The generators 814, 816 may each include an engine, a fuel mechanism, an alternator, a voltage regulator, a cooling and exhaust system, and a lubricating system. The fuel mechanism may include a fuel tank, fuel pipes, a fuel filter, and the like.

The generators 814, 816 may include a cooling system. Continuous usage of the generator 814, 816 may cause components to heat up. The cooling system (and ventilation system) may withdraw heat produced in the process. In some cases, heat byproduct from the generator may be used by and provided to the building. In such cases, the generator may not include a cooling system and/or ventilation system. In some cases, components of the generator that implement the cooling and ventilation functions (or similar components thereto) may be adapted or reconfigured to capture the heat byproduct and pass it to the building or other system.

The generator 814, 816 is configured to generate and supply one or more forms of energy to the building. The generator 814, 816 converts mechanical energy obtained from an external source into electrical energy as the output. The generator 814, 816 may generate heat as a byproduct of generating electricity. The generator 814, 816 may be adapted to capture the heat byproduct and supply it to the facility 810.

The diesel generator 816 and the natural gas generator 814 may each include a switch for changing a switch state (i.e. on or off) of the power source on the direction of the onsite computing device 804. The computer system stores the switch states of the diesel generator 816 and the natural gas generator 814. The generators 814, 816 may be communicatively linked to the onsite computing device 804. The generator 814, 816 includes at least an on and an off state. When on, the generator 814, 816 generates and supplies power to the facility 810. When off, the generator 814, 816 does not supply power to the facility 810. The generator 814, 816 includes a switch. The switch can be used to turn the generator on or off.

The onsite power source 802 includes an E-house 818. The E-house 818 may be a pre-fabricated walk-in modular outdoor enclosure to house a medium voltage and low voltage switchgear as well as auxiliary equipment. The E-house 818 may be easy to assemble and put into operation. The E-house 818 gathers and coordinates non-utility power (generation, battery, fuel cell power, ect,) into a common power bus by using automated breakers. The E-house 818 distributes non-utility power to the main building loads.

The onsite power source 802 includes an outdoor switchgear 820. Where there is no room in main building or conditions require, automated switchgear 820 is added to independently disconnect utility power and allow connection of E-house power sources.

The onsite power source 102 may include a sound attenuated enclosure (SAE). The SAE reduces noise generated by the onsite power source 102. In some cases, the SAE may reduce the noise level of the generator 814, 816 to that of an idling car. Sound Attenuated Enclosure may be an intermodal container with added sound attenuation/absorbing materials. The SAE may be a bespoke portable building with sound attenuation. The SAE may include sheet attenuation materials that dissipate sound energy using density and air voids.

The site 800 includes a plurality of sensors. The sensors transmit various data about the use of power, operation of various onsite components, environmental conditions at the site 800, and the like, to the onsite computing device 804 for analysis by the computer system.

The sensors may be located in the facility 810, in the structure(s) housing the onsite power source 802, or elsewhere at the site 800.

The sensors may include analog and/or digital sensors. The sensors may include temperature sensors, pressure sensors, flow sensors, frequency sensors, detectors (smoke, fire, flame, heat), and the like.

The site 800 includes a plurality of intelligent end devices. The intelligent end devices collect various data about the use of power, operation of various onsite components, environmental conditions at the site 800, and the like, and transmit the data to the onsite computing device 804 for analysis by the computer system. The intelligent end devices may be located in the facility 810, in the structure(s) housing the onsite power source 802, or elsewhere at the site.

The intelligent end devices may be programmable and include processing capabilities. The intelligent end devices include balance of plant (BOP) equipment. The intelligent end devices include protection relays. The intelligent end devices may acquire and transmit electrical data including voltages, currents, phases, harmonics, etc. The intelligent end devices may acquire and transmit data on breaker status, indoor and outdoor temperature, HVAC status, etc.

The sensors and intelligent end devices are connected to the onsite computing device 804 via the network. In some cases, the sensors may provide data to the intelligent end devices, which then send the data (which may have been further processed) to the onsite computing device 804. The onsite computing device 803, sensors, and intelligent end devices may communicate with one another using a multi-platform integrated communication interface.

Generally, the onsite power source 802 provides power to the facility 810 on the direction of the computer system. The computer system includes an application integration platform (AIP) and a digital control system (DCS). The AIP may be run on the offsite computing device. The DCS may be run on the onsite computing device 804. The offsite computing device may include a system image of the DCS.

The computer system is configured to collect and analyze data to select among the natural gas generator 814, the diesel generator 816, and the offsite power source. For example, the system may be configured to select, at a first level, between the offsite power source and the onsite power source 802. At a second level, the system may be configured to select between the diesel generator 816 and the natural gas generator 814.

The computer system receives and analyzes the sensor data and intelligent end device data (in addition to various external data received at the offsite computing device) to determine which of the offsite power source, the natural gas generator 814, and the diesel generator 816 should power the facility 810. The computer system may consider data related to safety, cost, and reliability of the power source(s) to make the determination.

In an example, the computer system may determine the onsite power source 802 is preferred over the offsite power source. The determination may be due to weather data (e.g. current or predicted weather data) indicating conditions that may reduce reliability of the offsite power source (e.g. increased likelihood of power outage, disturbance or disruption). For example, the weather data may indicate an ice storm or other weather event. The computer system may then determine which of the generators 814, 816 is preferred based on an analysis of cost data.

Figure 9:
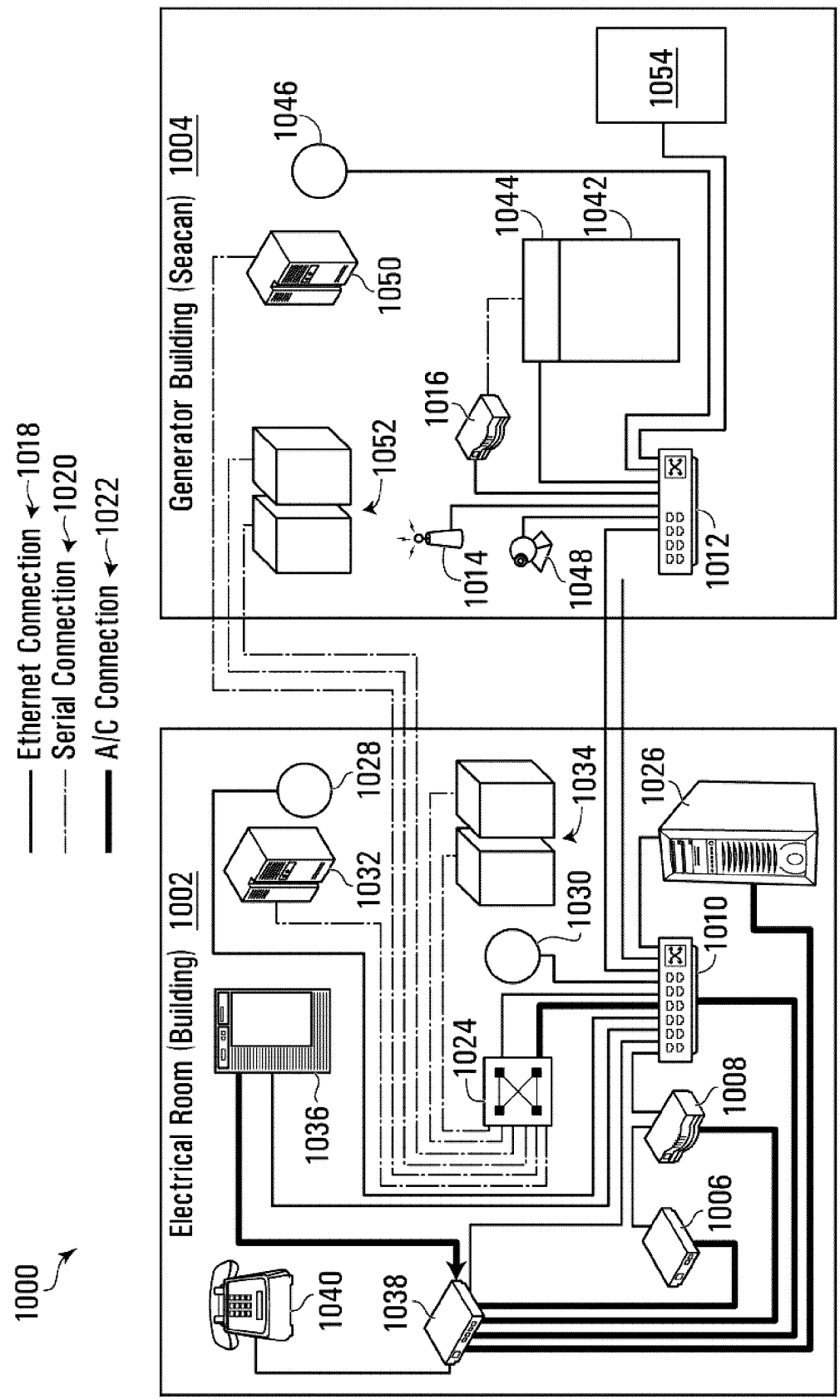
FIG. 9 is a schematic diagram of networked communications for onsite components of the building site of FIG. 8, according to an embodiment.

Referring now to FIG. 9, shown therein is a schematic diagram of networked communications between onsite components 1000 of the site 800 of FIG. 8, according to an embodiment.

The onsite components 1000 can be used to implement an onsite portion of a distributed control and computing system for enabling a private utility, such as system 100 of FIG. 1. Offsite components such as the offsite power source (e.g. offsite power source of FIG. 1) and the offsite computing device (including the application integration platform) are not shown in FIG. 9. Such components may be connectable to one or more of the onsite components 1000 in order to intelligently provide power to the building 902.

The site 900 includes an electrical room 1002 and a generator building 1004. The electrical room 1002 is located within the building 104. The generator building 1004 is located somewhere on site 900, for example near the onsite power source 102. The site 900 may include multiple generator buildings 1004. The generator building 1004 houses one or more components for the operation of the onsite power source 102. In an embodiment, the generator building 1004 is an intermodal container. The intermodal container may be modified as necessary to serve as a housing for a generator and related components.

The site 800 includes a network infrastructure. The network infrastructure includes a plurality of hardware devices for facilitating communication between onsite devices via a local area network (LAN). The network infrastructure may also facilitate communication between an onsite device (e.g. PLC 1024 below) and the AIP (offsite) via a wide area network (WAN).

Communication between onsite devices may include communication between electrical room devices, between generator building devices, or between an electrical room device and a generator building device. The network infrastructure can be distributed between the electrical room 1002 and the generator building 1004 to facilitate the communication of various system components.

The network infrastructure includes a modem 1006, a router firewall 1008, an electrical room network switch 1010, and a generator building network switch 1012. The network switches 1010, 1012 may be ethernet switches. The modem 1006 may be a DSL modem. The network infrastructure may also include a wireless access point 1014 and a serial to ethernet gateway 1016. The wireless access point 1014 and serial to ethernet gateway 1016 may be located in the generator building 1004. The network infrastructure devices are connected via an ethernet connection 1018.

Other forms of communication between onsite components include serial connection 1020 and A/C connection 1022. The serial connection 1020 may be a serial cable, such as a Belden com cable. The belden com cable may be rated 300V 18AWG. The cable may include four conductor and a shield. The NC connection 1022 may be an NC cable. The NC cable may be rated 600V. The AC cable may include 3 conductor and shield.

The electrical room includes a programmable logic controller (PLC) 1024. The PLC 1024 may be an industrial digital computer that has been ruggedized and adapted for analyzing site/building data and controlling onsite components (e.g. digital control system). The PLC 1024 may have high reliability control and ease of programming and process fault diagnosis.

The PLC 1024 includes software including the digital control system. The PLC 1024 is configured to implement the digital control system. The PLC 1024 software may be written in a special application on a personal computer, then downloaded by a direct-connection cable or over a network to the PLC 1024. The PLC 1024 software may be stored in the PLC 1024 in battery-backed-up RAM or other non-volatile flash memory.

The PLC 1024 may be communicatively linked to an offsite computing device implementing the application integration platform (AIP). The PLC 1024 may have a reduced memory capacity compared to the AIP (offsite computing device). The digital control system can be implemented on a reduced-memory computing device such as the PLC 1024 given the allocation of some computationally intensive tasks to the AIP (offsite). This may advantageously reduce memory-related costs associated with the onsite computing components such as the PLC 1024. This may reduce costs for users as computational expensive tasks may be pushed to the offsite device, which is operated by a system operator. The offsite device may control or communicate with many PLC 1024s located at facilities of different users, which allows costs for the individual users to be reduced.

The PLC 1024 is connected to the network switch 1010 via A/C connection and ethernet connection.

The electrical room 1002 includes an embedded computer 1026. The embedded computer 1026 is configured to implement the digital control system. The embedded computer 1026 is connected to the network switch 1010 via ethernet connection.

The embedded computer 1026 may receive onsite data from various onsite components including the main breaker 1032, breakers 1034, utility power meter, building power meter, breakers 1052, the generator breaker 1050, the genset power meter, the generator controller 1044, the generator 1042, and the load bank 1054. The received data may include main breaker data, electrical room breaker data, utility power meter data, building power meter, generator building breaker data, generator breaker data, genset power meter data, generator controller data, generator data, and load bank data.

The embedded computer 1026 may transmit the onsite data to an offsite computing device. The offsite computing device is configured to implement an application integration platform. The offsite computing device may include a system image of the digital control system for the site 800. The embedded computer 1026 may communicate with the offsite computing device via a secure network.

The embedded computer 1026 may receive external data from the offsite computing device.

The embedded computer 1026 may analyze the received onsite data (and in some cases, offsite data) to determine a preferred power source for the building. In other embodiments, the offsite computing device analyzes the onsite data along with the offsite data collected by the offsite computing device in order to determine the preferred power source. The determination may be generated at the offsite computing device and transmitted to the embedded computer. In another embodiment, the analysis is performed and the determination generated by the embedded computer 1026. Regardless of how the embedded computer 1026 comes to include the preferred power source determination (whether determining itself or receiving the determination from the offsite computing device), the embedded computing device 1026 generates controls instructions or signals using the preferred power source determination. The control instructions can be sent from the embedded computer 1026 to the PLC 1024 via the LAN. The control data may, for example, include instructions to shut off a particular component. The PLC can then control the necessary components on the basis of the control instructions received from the embedded computer 1026. In an embodiment, the embedded computer is the onsite computing device 320 of FIG. 3. In an embodiment FIG. 9 is an example of FIG. 3.

The electrical room 1002 includes a utility power meter 1028 and a building power meter 1030. Each meter may measures any one or more of voltage, current, apparent and real power (KVars), and power factor. Power may be independently measured at any one or more of main components, utility power supply, building main bus, individual generators and sub loads such as large motors.

The utility power meter 1028 and building power meter 1030 are each connected to the network switch 1010 via ethernet connection. The utility power meter 1028 and building power meter 1030 generate utility power meter data and building power meter data, respectively. The utility and building power meter data can be sent from the meters 1028, 1030 to the PLC 1024 via the LAN. The utility and building power meter data may also be provided to the AIP, for example via the PLC 1024. The PLC 1024 (or AIP) can use the utility power meter data and the building power meter data in the determination of a preferred power source for the building 904 via the digital control system (or AIP).

The electrical room 1002 includes a main breaker 1032 and a plurality of breakers 1034. The main breaker 1032 and breakers 1034 are each connected to the PLC 1024 via serial connection. The main breaker 1032 is an automatically operated electrical switch used to switch on or off devices or buildings by DCS and is designed to protect an electrical circuit from damage caused by excess current from an overload or short circuit. The main breaker 1032 interrupts current flow after a fault is detected. Unlike a fuse, which operates once and then must be replaced, the main breaker 1032 can be reset (either manually or automatically) to resume normal operation. The main breaker 1032 may be rated for 100% or more of the building load and serves as a main disconnection point.

The electrical room 1002 includes an uninterruptible power supply (UPS) 1036. The UPS 1036 is connected to the network switch 1010 via ethernet connection. The UPS 1036 may provide emergency power to a load when the input power source or mains power fails. The UPS 1036 may provide near-instantaneous protection from input power interruptions, by supplying energy stored in batteries, supercapacitors, or flywheels. The on-battery run-time of the UPS may be relatively The UPS 1036 may be used to protect hardware such as computers, data centers, telecommunication equipment or other electrical equipment where an unexpected power disruption could cause injuries, fatalities, serious business disruption or data loss.

The electrical room 1002 includes a remote power switch (RPS) 1038. The RPS 1038 may be a 4-port RPS having phone/LAN connections. The RPS 1038 may enable a user to remotely power on/off/cycle onsite equipment to reduce downtime, service costs and resources. The RPS 1038 is connected to the modem 1006, router firewall 1008, network switch 1010, UPS, and embedded computer via NC connection. The RPS 1038 is connected to the network switch 1010 via ethernet connection. The RPS 1038 is also connected to a telephone 1040 for RPS dial-in via an ethernet connection.

The generator building 1004 includes a generator 1042. The generator 1042 is an onsite power source (e.g. onsite power source 802 of FIG. 8) for the building. The generator 1042 may be the diesel generator 816 or the natural gas generator 814. In variations, the site may have a plurality of generator buildings 1004, with each generator building 1004 housing an onsite power source 102 (for example, a diesel generator building, a natural gas generator building, etc.). In yet further variations, multiple onsite power sources may be housed in a single generator building 1004, where appropriate.

The generator building 1004 includes a generator controller (genset controller) 1044 for controlling the generator 1042. The generator controller 1044 is connected to the network switch 1012 via an ethernet connection.

The generator controller 1044 may generate generator controller data. The generator controller data can be sent to the PLC 1024 via the LAN. Generator controller data may also be provided to the AIP, for example via the PLC 1024. The generator controller 1044 may receive information from the PLC 1024. In an example, the PLC 1024 may communicate (i.e. send a signal) with the genset controller 1044 to change the switch state of the generator 1042 (i.e. turn the generator on/off). The generator controller 1044 includes a switch for powering the generator 1042 on/off (i.e. changing the switch state, enabling or disabling the power source).

Upon receiving the signal from the PLC 1024, the generator controller 1044 may activate the switch, changing the switch state of the generator 1042.

The generator controller 1044 may be connected to the serial to ethernet gateway 1016 via serial connection. The gate way is used to condition serial data from an IED to Ethernet or TCP/IP depending on IED communication The generator building 1004 includes a genset power meter 1046. The genset power meter 1046 is connected to the network switch 1012 via ethernet connection. The genset power meter 1046 generates genset power meter data. The genset power meter data can be sent to the PLC 1024 via the LAN. The genset power meter data may also be provided to the AIP, for example via the PLC 1024. The PLC 1024 (or AIP) can use the genset power meter data in the determination of a preferred power source for the building 904 via the digital control system (or AIP).

As described above, the generator building 1004 may include the wireless access point 1014. The wireless access point 1014 is connected to the network switch 1012 via ethernet cable. The wireless access point 1014 may allow one or more wireless devices to connect to the LAN/network. Devices may include some instruments, maintenance laptops, wireless cameras.

The generator building 1004 includes an IP camera 1048. The IP camera 1048 is connected to the network switch 1012 via ethernet connection. The IP camera 1048 may be a digital video camera that receives control data and sends image data via the Internet. The IP camera 1048 may allow a remote operator a greater degree of monitoring and surveillance. The IP camera 1048 may have sound, motion detection with recording and alarm sequences to alert remote operators.

The generator building 1004 includes a generator breaker 1050. The generator breaker 1050 may be an effective protection device for the transformer and the generator 1042. The generator breaker 1050 is connected to the PLC 1024 via a serial connection.

The generator building 1004 includes a plurality of breakers 1052. The breakers 1052 are connected to the PLC 1024 via a serial connection.

The site 900 also includes a load bank 1054. The load bank 1054 may develop an electrical load, apply the load to an electrical power source and convert or dissipate the resultant power output of the source. The load bank 1054 may include load elements with protection, control, metering and accessory devices required for operation. The load bank 1054 may ensure the proper running of equipment in the event of power outages. The load bank 1054 may create a load similar to daily use and test a power source for running efficiency. By using certain loads the endurance and stability of the generator can be measured. If there are any errors, the load bank 1054 can calibrate the generator allowing it to meet the desired tolerance and required specifications.

The systems and methods described herein can enable a private utility for a building. By enabling the private utility, a viable power alternative to the public grid is provided. The systems and methods may give a user control over the amount of power generated and may reduce costs significantly. The systems and method may also generate and supply power in a more environmentally friendly manner.

The systems and methods may advantageously provide the user with a secure system for receiving power. The systems include distributed computing components (e.g. onsite and offsite computing devices, DCS, AIP) that may be configured to reduce the threat of cyber or physical attack.

For example, by limiting threat exposure of onsite devices or the DCS by restricting offsite communication to a secure connection with the offsite computing device or AIP, the chances of suffering an attack may be lessened.

The systems and methods may offset high electricity prices by producing power more efficiently than traditional utilities. This may save the user money by allowing them to pay for power at a rate that is lower than what a utility can provide. For example, using the systems and methods described herein, the system operator may be able to charge the user a fixed monthly fee at a rate less than the public utility. This is not only financially advantageous but also may provide greater predictability (or less uncertainty) for the user.

The system and methods of the present disclosure may advantageously provide the user with a sustainable system for receiving power. The systems and methods may provide a more sustainable source of power compared to the public utility. The systems and methods may operate at a higher efficiency compared to traditional power systems (e.g. public grid, public grid and backup generator, etc.). The systems and methods may allow the user to lower its CO2 emissions and overall carbon footprint.

The systems and methods of the present disclosure may advantageously provide the user with a more reliable system for receiving power. The systems and methods include synchronized and redundant power sources that provide power independent of weather and time considerations and may reduce exposure to blackouts and brownouts. A brownout is an intentional or unintentional drop in voltage in an electrical power supply system. Intentional brownouts may be used for load reduction in an emergency. The reduction may last for minutes or hours, as opposed to a short-term voltage sag (or dip). The term brownout comes from the dimming experienced by incandescent lighting when the voltage sags. A voltage reduction may be an effect of disruption of an electrical grid or may occasionally be imposed in an effort to reduce load and prevent a power outage, known as a blackout. Brownouts can cause poor performance of equipment or even incorrect operation. A blackout is the total loss of power to an area and is the most severe form of power outage that can occur. Blackouts which result from or result in power stations tripping are particularly difficult to recover from quickly. Outages may last from a few minutes to a few weeks depending on the nature of the blackout and the configuration of the electrical network. A power outage (also called a power cut, a power out, a power blackout, power failure or a blackout) is a short-term or a long-term loss of the electric power to a particular area. There are many causes of power failures in an electricity network. Examples of these causes include faults at power stations, damage to electric transmission lines, substations or other parts of the distribution system, a short circuit, cascading failure, fuse or circuit breaker operation.

The systems and methods of the present disclosure may advantageously provide the user with a portable system for receiving power. Components of the system can be placed onsite at the building. Components of the system 100 placed on-site can be moved to a second location, for example, if the user moves facilities. The portability of the system 100 (or components thereof) may reduce line loss and power loss factors.

While the above description provides examples of one or more apparatus, methods, or systems, it will be appreciated that other apparatus, methods, or systems may be within the scope of the claims as interpreted by one of skill in the art.

The invention claimed is:

1. A system for enabling a private utility at a building, the system comprising:
    a plurality of power sources, each of the power sources configured to provide power to the building when enabled, the plurality of power sources including a primary power source and a secondary power source;
    at least one external data source;
    at least one onsite data source;
    a computer system communicatively connected to the plurality of power sources, the at least one external data source, and the at least one onsite data source;
    wherein the computer system is configured to:
        receive external data about the plurality of power sources from the at least one external data source;
        receive building data about the plurality of power sources from the at least one onsite data source;
        determine a preferred power source for the building based on the external data and the building data;
    wherein the computer system is further configured to provide a power source hierarchy wherein the primary power source is an active power source and the secondary power source is an inactive power source, and wherein when a performance metric is not met by the primary power source, the secondary power source becomes the active power source and the primary power source is disabled from providing the power to the building; and
    a control subsystem communicatively connected to the computer system and the plurality of power sources, the control subsystem configured to:
        receive a control instruction from the computer system, the control instruction generated by the computer system based on the preferred power source determination, wherein the control instruction includes at least disabling the primary power source and turning on the secondary power source; and
        adjust an operating parameter of at least one of the power sources according to the control instruction.

2. The system of claim 1, wherein the plurality of power sources comprises an offsite power source and at least one onsite power source.

3. The system of claim 2, wherein the at least one onsite power source includes a diesel generator and a natural gas generator.

4. The system of claim 1, wherein the at least one onsite data source includes a subsystem and an intelligent end device, the subsystem and the intelligent end device each configured to transmit building data to the computer system.

5. The system of claim 1, wherein the computer system comprises an offsite computing service and an onsite computing device, the offsite and onsite computing devices communicatively connected to each other via a secure network, wherein the offsite computing device is communicatively connected to the at least one external data source via a first network, and wherein the onsite computing device is communicatively connected to the at least one onsite data source via a second network.

6. A computer system for intelligently determining a preferred power source for providing power to a building, the power source determined from a plurality of power sources, the computer system comprising:
    a memory in communication with a processor, the memory comprising power source data, wherein the power source data includes external data and building data;

wherein the processor comprises:
  a source determinator configured to analyze the power source data to determine the preferred power source from the plurality of power sources;
  wherein the plurality of power sources includes a primary power source and a secondary power source;
  wherein the processor is further configured to provide a power source hierarchy wherein the primary power source is an active power source and the secondary power source is an inactive power source; and wherein when a performance metric is not met by the primary power source, the secondary power source becomes the active power source and the primary power source is disabled from providing the power to the building;
  a source controller module, and wherein the source controller module is configured to:
    receive the preferred power source determination from the source determinator;
    compare the preferred power source determination with active power source data, the active power source data stored in the memory; and
    generate a control instruction based on the comparison of the preferred power source determination with the active power source data, wherein the control instruction includes at least disabling the primary power source and turning on the secondary power source.

7. The computer system of claim 6, wherein the memory further comprises at least one comparator, and wherein the source determinator determines the preferred power source by comparing the power source data to the comparator.

8. The computer system of claim 7, wherein the comparator is a threshold or a performance band.

9. The computer system of claim 6, wherein the memory further comprises power source hierarchy data, the power source hierarchy data including a primary power source and a secondary power source.

10. The computer system of claim 6, wherein the processor further comprises an external data collector module for collecting at least a portion of the external data from the at least one external data source.

11. The computer system of claim 6, wherein the external data includes at least one of weather data, price data, demand data, temperature data, conversion cost data, stakeholder data, and measurement and verification data.

12. The computer system of claim 6, wherein the building data includes at least one of subsystem data, intelligent end device data, meter data, source activation data, byproduct data, and environmental impact data.

13. The computer system of claim 6, wherein the source determinator is further configured to analyze cost data for the power sources and determine a preferred power source based on the cost data.

14. The computer system of claim 6, wherein the source determinator is further configured to analyze reliability data for the power sources and determine a preferred power source based on the reliability data.

15. The computer system of claim 6, wherein the source determinator is further configured to analyze safety data for the power sources and determine a preferred power source based on the safety data.

16. A method of enabling a private utility at a building, the method comprising:
  providing a plurality of power sources, wherein one of the plurality of power sources is enabled such that the enabled power source provides power to the building, the plurality of power sources including a primary power source and a secondary power source;
  determining a preferred power source for the building based on power source data, the power source data including building data and external data for the plurality of power sources;
  if the preferred power source is different from the enabled power source, changing the enabled power source such that the building receives power from the preferred power source;
  providing a power source hierarchy wherein the primary power source is an active power source and the secondary power source is an inactive power source;
  selecting the secondary power source as the active power source when a performance metric is not met by the primary power source and disabling the primary power source from providing the power to the building;
  receiving, by a source controller module, the preferred power source determination from the source determinator;
  comparing, by a source controller module, the preferred power source determination with active power source data, the active power source data stored in the memory; and
  generating, by a source controller module, a control instruction based on the comparison of the preferred power source determination with the active power source data, wherein the control instruction includes at least disabling the primary power source and turning on the secondary power source.

17. The method of claim 16, further comprising:
  receiving, at an offsite computing device, the external data from at least one external data source; and
  receiving, at an onsite computing device, the building data from at least one onsite data source.

18. The method of claim 16, wherein the determining the preferred power source comprises comparing at least a subset of the power source data to a comparator.

19. The system of claim 1, further comprising a source determinator configured to operate based on a plurality of thresholds, wherein each of the plurality of thresholds is weighted differently; the source determinator further configured to determine if an environmental threshold is met; wherein when the environmental threshold is met, the primary power source is selected for power supply; and wherein the source determinator is configured to detect an unreliable condition and initiate a pre-emptive switch to the secondary power source to reduce downtime.

20. The computer system of claim 6, wherein the processor further comprises a source determinator configured to operate based on a plurality of thresholds, wherein each of the plurality of thresholds is weighted differently; the source determinator further configured to determine if an environmental threshold is met; wherein when the environmental threshold is met, the primary power source is selected for power supply; and wherein the source determinator is configured to detect an unreliable condition and initiate a pre-emptive switch to the secondary power source to reduce downtime.

* * * * *